US009016846B2

(12) United States Patent
Ikeda et al.

(10) Patent No.: US 9,016,846 B2
(45) Date of Patent: Apr. 28, 2015

(54) ACTINIC ENERGY RADIATION CURABLE INKJET INK AND ACTINIC ENERGY RADIATION CURABLE INKJET RECORDING METHOD

(75) Inventors: Masashi Ikeda, Tokyo (JP); Hirotaka Iijima, Tokyo (JP); Toshiyuki Takabayashi, Tokyo (JP); Tomoe Sekiguchi, Tokyo (JP); Akio Maeda, Tokyo (JP)

(73) Assignee: Konica Minolta Holdings, Inc. (JP)

( * ) Notice: Subject to any disclaimer, the term of this patent is extended or adjusted under 35 U.S.C. 154(b) by 143 days.

(21) Appl. No.: 13/817,375

(22) PCT Filed: Jul. 13, 2011

(86) PCT No.: PCT/JP2011/065948
§ 371 (c)(1),
(2), (4) Date: Feb. 15, 2013

(87) PCT Pub. No.: WO2012/023368
PCT Pub. Date: Feb. 23, 2012

(65) Prior Publication Data
US 2013/0141505 A1 Jun. 6, 2013

(30) Foreign Application Priority Data

Aug. 19, 2010 (JP) .................. 2010-183734
Aug. 19, 2010 (JP) .................. 2010-183735

(51) Int. Cl.
*B41J 2/01* (2006.01)
*C09D 11/101* (2014.01)
*B41J 2/21* (2006.01)
*C09D 11/322* (2014.01)
*C09D 11/40* (2014.01)
*B41J 11/00* (2006.01)

(52) U.S. Cl.
CPC ............. *C09D 11/101* (2013.01); *B41J 2/2107* (2013.01); *C09D 11/322* (2013.01); *C09D 11/40* (2013.01); *B41J 11/002* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ......... 347/100, 99, 88, 101, 102, 103, 21, 20, 347/9, 95, 96; 106/31.6, 31.13, 31.27; 523/160, 161
See application file for complete search history.

(56) References Cited

U.S. PATENT DOCUMENTS

| 6,966,643 | B2 * | 11/2005 | Hale et al. ........................ 347/99 |
| 7,501,015 | B2 | 3/2009 | Odell et al. |
| 2002/0065335 | A1 * | 5/2002 | Noguchi et al. ................. 347/44 |
| 2002/0149659 | A1 * | 10/2002 | Wu et al. ........................ 347/102 |
| 2007/0211110 | A1 * | 9/2007 | Iftime et al. ..................... 347/52 |
| 2008/0081119 | A1 * | 4/2008 | Oyanagi et al. ............ 106/31.13 |
| 2010/0118095 | A1 * | 5/2010 | Nakamura ..................... 347/102 |

FOREIGN PATENT DOCUMENTS

| JP | 2-10691 A | 1/1990 |
| JP | 2003-105240 A | 4/2003 |
| JP | 2003-105241 A | 4/2003 |
| JP | 2005-126507 A | 5/2005 |
| JP | 2005-126508 A | 5/2005 |
| JP | 2005-126509 A | 5/2005 |
| JP | 2005-162962 A | 6/2005 |
| JP | 2005-255821 A | 9/2005 |
| JP | 2009-510184 A | 3/2009 |
| JP | 2009-132919 A | 6/2009 |
| JP | 2010-106275 A | 5/2010 |
| JP | 2010-115791 A | 5/2010 |
| JP | 2011-157410 A | 8/2011 |
| WO | 2007/025893 A1 | 3/2007 |
| WO | 2010/053004 A1 | 5/2010 |

OTHER PUBLICATIONS

Notification of Reasons for Refusal for Japanese Patent Application No. 2010-183734, drafted Jan. 21, 2014, with English translation.
International Search Report for International Application No. PCT/JP2011/065948, mailed Oct. 18, 2011, with English translation.

* cited by examiner

*Primary Examiner* — Manish S Shah
(74) *Attorney, Agent, or Firm* — Cantor Colburn LLP

(57) ABSTRACT

Provided are an actinic energy radiation curable ink, which can achieve a high fineness and natural glossiness when recording is carried out onto a non-absorptive recording medium such as a film or a laminated paper or a slightly absorptive recording medium such as a coated paper; and an actinic energy radiation curable inkjet recording method. This actinic energy radiation curable ink, which is to be used in inkjet recording, is characterized by: said actinic energy radiation curable ink undergoing reversible sol/gel phase transition depending on temperature; said actinic energy radiation curable ink containing from 1% or more by mass to less than 10% by mass of a gelling agent; and, at temperature $Tm$ (° C.) that is separately defined, the storage elastic modulus ($G'$) of the actinic energy radiation curable ink being from 0.1 or more Pa to less than 1000 Pa and the storage elastic modulus ($G'$) being smaller than the loss elastic modulus ($G''$) thereof.

14 Claims, 3 Drawing Sheets

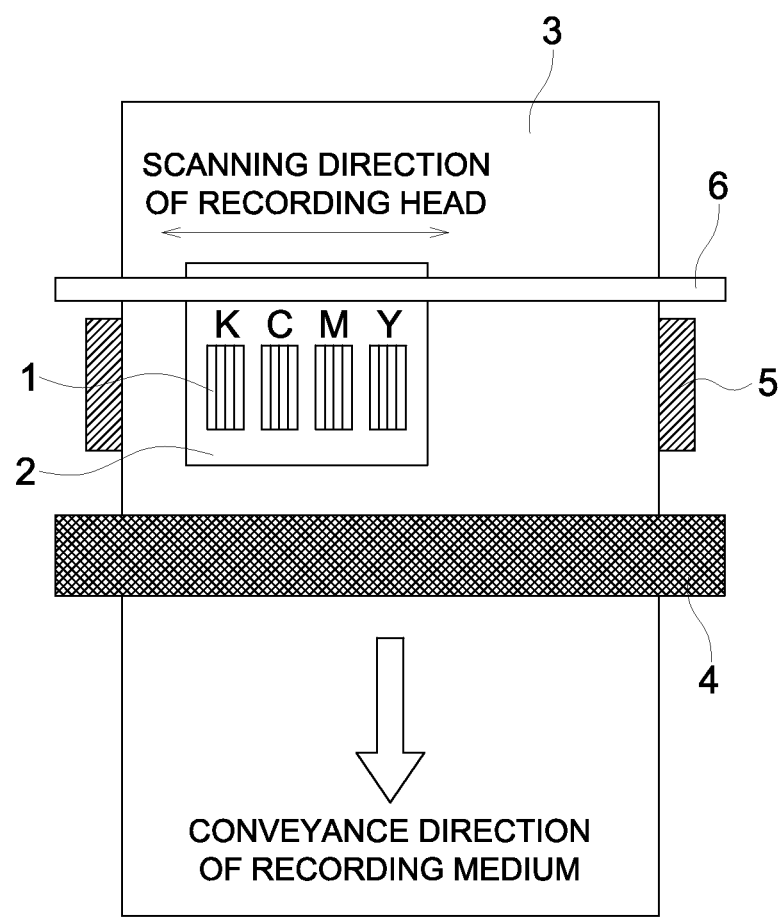

ACTINIC ENERGY RADIATION CURABLE INKJET INK AND ACTINIC ENERGY RADIATION CURABLE INKJET RECORDING METHOD

CROSS REFERENCE TO RELATED APPLICATION

This is the U.S. national stage of application No. PCT/JP2011/065948, filed on 13 Jul. 2011. Priority under 35 U.S.C. §119(a) and 35 U.S.C. §365(b) is claimed from Japanese Application No. 2010-183735, filed 19 Aug. 2010, and Japanese Application No. 2010-183734, filed 19 Aug. 2010, the disclosures of which are also incorporated herein by reference.

FIELD OF THE INVENTION

The present invention relates to an inkjet record method using an actinic energy radiation curable inkjet ink containing a gelling agent and an actinic energy radiation curable composition.

TECHNICAL BACKGROUND

The actinic energy radiation curable composition which can be cured by the activity energy radiation such as ultraviolet radiation and an electron beam is put in practical use by various uses such as paints for plastics, paper, woodwork, and inorganic materials, adhesives, printing inks, printing circuit board, and electric insulation.

As an inkjet ink system using these polymerizable composition, proposed is an ultraviolet radiation curable inkjet ink curable by an ultraviolet radiation. The inkjet system using the ultraviolet radiation curable ink is attracting attention in recent years in view of ensuring high abrasion resistance and adhesion to the non-ink absorbable recording medium.

However, when the high speed recording is performed such as a single pass recording mode using the line recording head or a high speed serial mode in small passes by the image forming method using these ultraviolet radiation curable inkjet system, the coalescence of dots adjacent each other could not be inhibited, and caused a problem of inferior image quality. Moreover, when a color image was recorded, color mixture occurred between colors and causes a problem of image quality deterioration.

As a method for resolving the above-mentioned problems, disclosed was a technology which contained a gelling agent in an ink and used an actinic energy radiation curable ink which had a characteristics of solid/liquid phase transition depending on temperature, thereby solidified an ink droplet simultaneously with the deposition of the droplet, resulted in preventing the coalescence of ink droplets and degradation of the image quality. However, this method sometimes caused an extreme decrease of glossiness in an image depending on physical properties of the ink or printing conditions, or an unnatural image quality without sense of homogeneous by glitter in the image.

For example, Patent Document 1 discloses a method of forming an image using an inkjet ink containing a curable gelling agent and a curable monomer. This Patent Document is characterized by using so called elastic gel ink which has high viscosity of $1.0 \times 10^6$-$1.0 \times 10^9$ mPa·s at a recording temperature, and storage elastic modulus G' being larger than loss elastic modulus G''. In the case of recording by using such elastic gel ink, since the droplet was solidified too strong, fine unevenness arose on the image surface and causes problems such as decrease of glossiness or the unnatural glitter in the image.

For example, Patent Document 2 discloses an image forming apparatus using an inkjet ink containing a photo-curable monomer and a gelling agent and recording was performed at a temperature of a substrate being 5° C. or more lower than a gelation temperature. However, this Patent Document aimed at the improvement in curability, and a method for arranging the homogeneous glossiness was not indicated at all. Moreover, in the case of using the low molecule gelling agent as used in this patent document which formed a fiber structure, there was a case where gelation temperature became excessively higher than needed depending on the kind of ink, or the ink after gelling became hard and the decrease of glossiness was observed since the droplet was solidified too strong in the above-mentioned temperature range.

Moreover, Patent Document 3 discloses a curable ink characterized in that the glossiness of a printed region was closely matching the glossiness of a substrate, however the specific means how to match the glossiness was not indicated. Moreover, the ink in this Patent Document had the viscosity of $1.0 \times 10^5$-$1.0 \times 10^7$ mPa·s at the recording temperature of 50° C. or less. The ink had strong solidification strength to the extent of suppressing ink penetration into a plain paper. Therefore, unless applying the intermediate transferring system, there caused a problem of the extreme decrease of glossiness or glitter in the image resulting from dot solidification strength being too strong.

Moreover, Patent Document 4 discloses a technology using a thixotropic curable gel ink in which the recording was performed so that the temperature difference between the ink at ejection and the recording medium became 30° C. or more. When the gelation temperature of the photo curable ink was high or when the ink after gelling became hard, the decrease of glossiness was observed which was resulted from the dot solidification strength being too strong in the above-mentioned temperature range.

Moreover, Patent Document 5 disclosed an attempt to increase the image glossiness by heating an over-coating liquid containing a gelling agent to the same or higher temperature than a phase transition temperature during the time from the deposition on the recording medium to the UV radiation irradiation. It was satisfactory in the case of using the overcoat liquid. However when the ink containing a gelling agent and a colorant for forming the image was used as the same manner, the deteriorated image quality such as color mixture occurred and it had become a problem.

PRIOR TECHNICAL DOCUMENT

Patent Document

Patent Document 1: U.S. Pat. No. 7,501,015
Patent Document 2: Japanese Patent Application Publication (hereinafter also referred to as JP-A) No. 2010-115791
Patent Document 3: JP-A No. 2009-132919
Patent Document 4: WO2007/025893
Patent Document 5: JP-A No. 2010-106275

SUMMARY

Problems to be Solved by the Present Invention

One of the objects of the present invention is to provide an actinic energy radiation curable ink, which can achieve a high fineness and natural glossiness when recording is performed onto a non-absorptive recording medium such as a film or a laminated paper or a slightly absorptive recording medium such as a coated paper; and an actinic energy radiation curable inkjet recording method.

Means to Solve the Problems

The above object has been attained by the following constitutions:

1. An actinic energy radiation curable inkjet ink for an inkjet recording, wherein the actinic energy radiation curable inkjet ink undergoes reversible sol/gel phase transition depending on temperature;

the actinic energy radiation curable inkjet ink contains a gelling agent in the range from not less than 1% by mass to less than 10% by mass; and the actinic energy radiation curable inkjet ink has a storage elastic modulus G' at temperature Tm (° C.) in the range from not less than 0.1 Pa to less than 1,000 Pa and the storage elastic modulus G' smaller than a loss elastic modulus G" thereof, provided that Tm (° C.) is a temperature defined by Tm=Tgel−Δ, wherein ΔT is further represented by a difference ΔT=Tsol−Tgel between a solation temperature Tsol (° C.) and a gelation temperature Tgel (° C.) of the actinic energy radiation curable inkjet ink and the solation temperature Tsol is defined by a temperature where the storage elastic modulus G' reaches 0.1 Pa when a temperature change of a dynamic viscoelasticity is measured under a temperature raising rate of 0.1° C./s, a strain of 5% and an angle frequency of 10 radian/s, and the gelation temperature Tgel is further defined by a temperature when the storage elastic modulus G' reaches 0.1 Pa when a temperature change of a dynamic viscoelasticity is measured under a temperature lowering rate of 0.1° C./s, a strain of 5% and an angle frequency of 10 radian/s.

2. The actinic energy radiation curable inkjet ink of item 1, wherein a content of the gelling agent is in the range from not less than 2% by mass to less than 7% by mass.

3. The actinic energy radiation curable inkjet ink of item 1 or 2, wherein ΔT is in the range from not less than 3° C. to less than 20° C.

4. The actinic energy radiation curable inkjet ink of any one of items 1 to 3, wherein the solation temperature Tsol is in the range from not less than 40° C. to less than 90° C.

5. The actinic energy radiation curable inkjet ink of any one of items 1 to 4, wherein a viscosity of the actinic energy radiation curable inkjet ink in an inkjet recording head is in the range from not less than 3 mPa·s to less than 20 mPa·s.

6. An actinic energy radiation curable inkjet recording method comprising a step of recording an actinic energy radiation curable inkjet ink via an inkjet recording head onto a recording medium arranging a temperature in the range of Tm ±5° C., wherein the actinic energy radiation curable inkjet ink undergoes reversible sol/gel phase transition depending on temperature;

the actinic energy radiation curable inkjet ink contains a gelling agent in the range from not less than 1% by mass to less than 10% by mass; and the actinic energy radiation curable inkjet ink has a storage elastic modulus G' at temperature Tm (° C.) in the range from not less than 0.1 Pa to less than 1,000 Pa and the storage elastic modulus G' smaller than a loss elastic modulus G' thereof, provided that Tm (° C.) is a temperature defined by Tm=Tgel−ΔT, wherein ΔT is further represented by a difference ΔT=Tsol−Tgel between a solation temperature Tsol (° C.) and a gelation temperature Tgel (° C.) of the actinic energy radiation curable inkjet ink and the solation temperature Tsol is defined by a temperature where the storage elastic modulus G' reaches 0.1 Pa when a temperature change of a dynamic viscoelasticity is measured under a temperature raising rate of 0.1° C./s, a strain of 5% and an angle frequency of 10 radian/s, and the gelation temperature Tgel is further defined by a temperature where the storage elastic modulus G' reaches 0.1 Pa when a temperature change of a dynamic viscoelasticity is measured under a temperature lowering rate of 0.1° C./s, a strain of 5% and an angle frequency of 10 radian/s.

7. The actinic energy radiation curable inkjet recording method of item 6, wherein a temperature of the recording medium is arranged in the range of Tm ±3° C.

8. The actinic energy radiation curable inkjet recording method of item 6, wherein a difference of temperatures between the gelation temperature and the temperature of the recording medium is controlled in the range from 5 to 15° C.

9. The actinic energy radiation curable inkjet recording method of any one of items 6 to 8, wherein a content of the gelling agent is in the range from not less than 2% by mass to less than 7% by mass.

10. The actinic energy radiation curable inkjet recording method of any one of items 6 to 9, wherein ΔT is in the range from not less than 3° C. to less than 20° C.

11. The actinic energy radiation curable inkjet recording method of any one of items 6 to 10, wherein the solation temperature Tsol is in the range from not less than 40° C. to less than 90° C.

12. The actinic energy radiation curable inkjet recording method of any one of items 6 to 11 comprising a step of heating the actinic energy radiation curable inkjet ink in the inkjet head in the range of from not less than Tsol+10° C. to less than Tsol+40° C.

13. The actinic energy radiation curable inkjet recording method of any one of items 6 to 12, wherein a viscosity of the actinic energy radiation curable inkjet ink in the inkjet head is in the range from not less than 3 mPa·s to less than 20 mPa·s.

14. The actinic energy radiation curable inkjet recording method of any one of items 6 to 13 comprising a step of curing the actinic energy radiation curable inkjet ink by irradiating an actinic energy radiation after forming an image.

Effects of the Invention

The present invention made it possible to provide an actinic energy radiation curable ink, which can achieve a high fineness and natural glossiness when recording is performed onto a non-absorptive recording medium such as a film or a laminated paper or a slightly absorptive recording medium such as a coated paper; and an actinic energy radiation curable inkjet recording method.

BRIEF DESCRIPTION OF THE DRAWING

FIG. 5: Serial recording system Inkjet recording apparatus.

PREFERRED EMBODIMENT OF THE INVENTION

Figure 1:
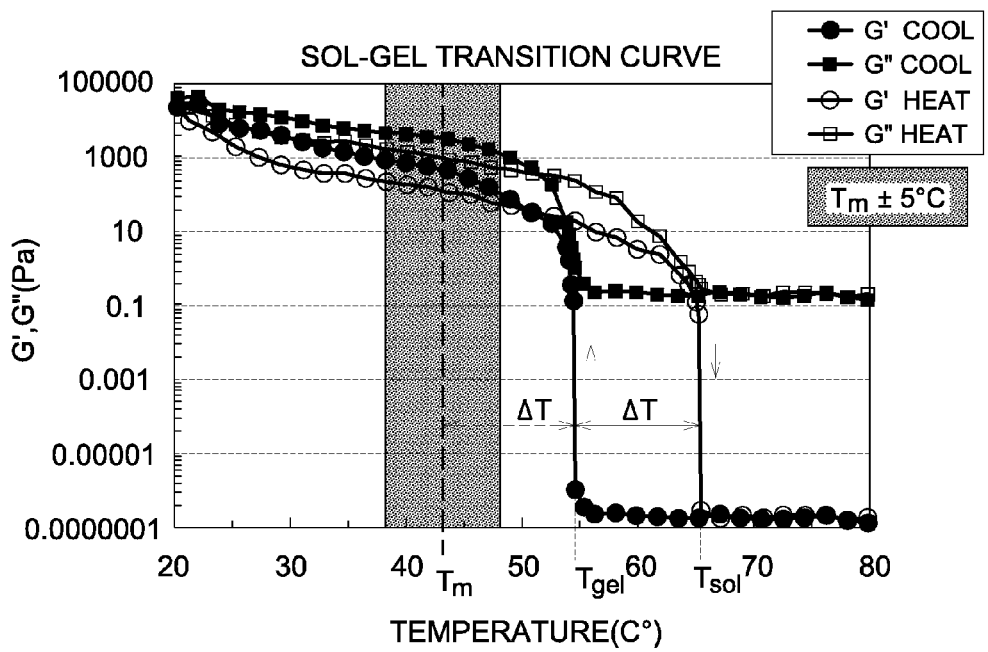
FIG. 1: Curve of dynamic viscoelasticity vs temperature change for actinic energy radiation curable ink (Ink No. 2).

An embodiment to practice the present invention will now be detailed.

The present invention provides the epoch-making ink for the image formation and the method for forming the image which can achieve the natural image glossiness as well as maintaining high definition by controlling the physical properties of the actinic energy radiation curable ink and the temperature of the recording medium in the suitable range and controlling the collapse of droplets in the suitable range.

The actinic energy radiation curable ink used by the present invention is characterized by containing the gelling agent from more than 1% by mass to less than 10% by mass and undergoing a reversible sol/gel phase transition according to the temperature. The sol/gel phase transition of the present invention refers to as the phenomenon where the ink in a solution state with fluidity at high temperature changes to the state where the whole liquid gelled by cooling below to gelation temperature and fluidity was lost. Further, the ink in the state of loosing fluidity at low temperature reversely returns to a liquid state with fluidity by heating more than solation temperature.

"Gel state" according to the present invention refers to a collective structure of material by loosing independent mobility as a result of an interaction such as a lamella structure, a polymer network with a non-covalent bond or a hydrogen bond, a polymer network formed by a physical coagulation, and a coagulation structure of fine particles, and a state of solidification or half-solidification or increased viscosity accompanied by a rapid viscosity increasing or a remarkable elasticity increasing. Moreover, sol state refers to the liquid state where the interaction formed by the above-mentioned gel state is canceled and converts to a solution having fluidity.

Moreover, the solation temperature according to the present invention is a temperature where fluidity appears by solation when warming the gelled ink. The gelation temperature refers to the temperature when the fluidity falls by gelling when cooling the ink in the sol state.

Since the actinic energy radiation curable ink which can undergo sol/gel phase transition is in the liquid state at high temperature, it can be ejected by an inkjet recording head. When the actinic energy radiation curable ink in the high temperature state is recorded, after ink droplet is deposited on the recording medium, the ink solidifies promptly by natural cooling by the difference of temperatures, resulting in preventing the collapse of the adjacent dots and image quality degradation. However, when the solidification strength of the ink droplet was strong, unevenness arose on the image by dots being isolated, whereby caused the heterogeneous sense of glossiness such as the extreme decrease of glossiness or an unnatural glittering glossiness. In view of the foregoing, the inventors of the present invention conducted diligent investigations. As a result, it was found that the most natural sense of glossiness was obtained by arranging the solidification strength of the ink droplet, the gelation temperature of the ink, the solation temperature of the ink, the temperature of the recording medium and the viscoelasticity of the ink during recording in the range of the present invention. Namely, the most natural glossiness was obtained when the temperature of the recording medium was arranged in the range of Tm ±5° C., and the storage elastic modulus G' at temperature Tm (° C.) was in the range from not less than 0.1 Pa to less than 1,000 Pa and the storage elastic modulus G' was smaller than the loss elastic modulus G" thereof, provided that the solation temperature was represented by Tsol (° C.), the gelation temperature was represented by Tgel (° C.), the difference Tsol−Tgel between the solation temperature and the gelation temperature was represented by ΔT and Tm=Tgel−ΔT.

Inventors consider this reason as follows: When the ink solidifies before the adjacent ink droplet deposits after the ink droplet deposited on the recording medium, the decrease of glossiness and the unnatural glittering image occurs. On the contrary, when the adjacent ink droplets solidify in course of time after deposited on the recording medium and collapsed together, it causes extreme degradation of image quality due to the collapse of droplets. Therefore, in order to optimize these relations, it is considered to be necessary to control the solidification velocity, i.e., the sol/gel transition velocity after an ink droplet deposits and solidifies.

As a result of the diligent investigations by the inventors, it was found that there is a close relationship between the sol/gel transition velocity and the temperature difference ΔT of the solation temperature and the gelation temperature. Namely, since the sol/gel transition velocity of the ink becomes slower as the value of ΔT is larger, in order to acquire the optimal solidification strength at the time of image formation, the temperature of the recording medium is necessary to set lower temperature. On the contrary, since the sol/gel transition velocity of the ink becomes faster as the value of ΔT is smaller, the temperature of the recording medium is necessary to set higher temperature.

As the result of further detail investigation, it was found that the optimal leveling was obtained resulting in the natural sense of glossiness by controlling the temperature of the recording medium at lower temperature than the gelation temperature by ΔT ° C. Moreover, by using the actinic energy radiation curable ink which has the storage elastic modulus G' at temperature Tm (° C.) in the range from not less than 0.1 Pa to less than 1,000 Pa and the storage elastic modulus G' smaller than the loss elastic modulus G" thereof, the ink after gelation becomes the viscous gel having the proper viscosity and the dot solidification strength can be properly controlled and resulting in obtaining the image with more natural sense of glossiness.

Herein, the homogeneous sense of glossiness according to the present invention does not refer to as an absolute glossiness value, for example, a 60° mirror reflection glossiness value, but refers to the state in which the heterogeneous glossiness in a part of the image such as unnatural glitter or unnecessary decrease of glossiness or glossiness unevenness like stripe resulting from the microscopic glossiness difference in the image is not seen, and the state of the homogeneous glossiness on the entire image, especially the solid printing portion.

The present invention made it possible to form the image without deterioration of the image quality and exhibiting excellent sharpness in the thin lines such as character and having the natural sense of glossiness by controlling the temperature of the recording medium in the range of Tm ±5° C., and further to form more excellent image by controlling the temperature of the recording medium in the range of Tm ±3° C.

The surface temperature of the recording medium is preferable to control at not less than 30° C. and less than 70° C.

Moreover, the preferable embodiment of the actinic energy radiation curable inkjet recording method using the above-mentioned actinic energy radiation curable ink will be detailed below.

Since the actinic energy radiation curable ink which can show sol/gel phase transition is in the liquid state at high temperature, it can be ejected by an inkjet recording head. When the actinic energy radiation curable ink in the high temperature state is recorded, after ink droplet is deposited on the recording medium, the ink solidifies promptly by natural cooling by the difference of temperatures, resulting in preventing the collapse of the adjacent dots and image quality degradation. However, when the solidification strength of the ink droplet was strong, unevenness arose on the image by dots being isolated, and this caused the sense of heterogeneous glossiness such as the extreme decrease of glossiness or an unnatural glittering glossiness. In view of the foregoing, the inventors of the present invention conducted diligent investigations. As a result, it was found that the collapse of the ink droplets can be inhibited, image quality degradation can be prevented and the most natural sense of glossiness was obtained by arranging the solidification strength of the ink droplet in the range of the present invention via arranging the storage elastic modulus G' and the loss elastic modulus G' of the actinic energy radiation curable ink; and also arranging the gelation temperature of the ink and the temperature of the recording medium in the range of the present invention. Namely, the high quality image by inhibiting the collapse of the ink droplets and the most natural sense of glossiness can be balanced when the actinic energy radiation curable inkjet ink contains the gelling agent in the range from not less than 1% by mass to less than 10% by mass and the difference of temperature between the gelation temperature (Tgel) and the temperature of the recording medium ($T_s$) is controlled in the range from 5 to 15° C.

Inventors consider this reason as follows: When the ink solidifies before the adjacent ink droplet deposits after the ink droplet deposited on the recording medium, the decrease of glossiness and the unnatural glittering image occurs. On the contrary, when the adjacent ink droplets solidify in course of time after deposited on the recording medium and collapsed together, it causes extreme degradation of image quality due to the collapse of droplets. As the result of the diligent investigations by the inventors, it was found that the optimal leveling was obtained resulting in the natural sense of glossiness by controlling the viscosity of the ink at the time of deposition.

According to the present invention, since the viscoelasticity of the ink droplet after gelation is controlled by arranging so that the storage elastic modulus G' of actinic energy radiation curable ink may have a predetermined relation about the loss elastic modulus of G", and also controlling the gelation temperature and the surface temperature of the recording medium. The viscosity of the ink at the time of deposition depends on the surface temperature of the recording medium, the structure of the gelling agent, and the amount of addition of the gelling agent. That is, by using the above-mentioned ink containing a gelling agent in the range from not less than 1% by mass to less than 10% by mass, the viscosity can be controlled in the above-mentioned substrate temperature range and the image quality and the natural sense of glossiness can be balanced.

In the present invention, it is preferable to control the difference of gelation temperature Tgel of ink by the gelling agent and the surface temperature Ts of the recording medium being 5-15° C., more preferable 5-10° C. The means of the temperature control of the recording medium will be described later.

Hereafter, the present invention will be detailed.

<Measurement of Physical Properties of Ink>

The actinic energy radiation curable ink of the present invention exhibits characteristic dynamic viscoelasticity. Herein, the dynamic viscoelasticity is a viscoelasticity behavior which is seen when vibration is applied to a viscoelastic body for changing stress or distortion periodically, and can be measured with equipment such as an oscillating-type rheometer. In dynamic viscoelasticity measurement, the value of storage elastic modulus G' and the loss elastic modulus of G" are acquired as a physical property value, and each has the close relationship with the elasticity and the viscosity of the ink, respectively. Dynamic viscoelasticity is described in detail in various books relating to rheology, for example, "Koza: Rheology" edited by Japan Rheology gakkai (1992), and "Rheology data handbook" edited by Japan Rheology gakkai (2006). Theses are the important physical properties daily used by the engineer who treats material.

The solation temperature Tsol, the gelation temperature Tgel, the storage elastic modulus G' and the loss elastic modulus of G" of the actinic energy radiation curable ink used by the present invention are obtained by measuring the temperature change of the dynamic viscoelasticity of the actinic energy radiation curable ink by using various rheometers (for example, Physica MCR series, stress control type rheometer using a cone plate, produced by Anton Paar). Since the solation temperature and the gelation temperature change under temperature raising/temperature lowering rate, they are defined as follows in the present invention.

The storage elastic modulus G' and the loss elastic modulus of G" of the actinic energy radiation curable ink used by the present invention are the value obtained when a temperature change of a dynamic viscoelasticity is measured under a temperature raising/lowering rate of 0.1° C./s, a strain of 5% and an angle frequency of 10 radian/s. The solation temperature Tsol is defined by a temperature where the storage elastic modulus G' reaches 0.1 Pa when a temperature change of a dynamic viscoelasticity is measured under a temperature raising rate of 0.1° C./s, a strain of 5% and an angle frequency of 10 radian/s. The gelation temperature Tgel is further defined by a temperature where the storage elastic modulus G' reaches 0.1 Pa when a temperature change of a dynamic viscoelasticity is measured under a temperature lowering rate of 0.1° C./s, a strain of 5% and an angle frequency of 10 radian/s. Herein, the value obtained by dynamic viscoelasticity measurement under a temperature lowering step, was used for the value of G' and G" at Tm in the present invention. However, the value obtained by the measurement under a temperature raising step may be used instead.

Figure 2:
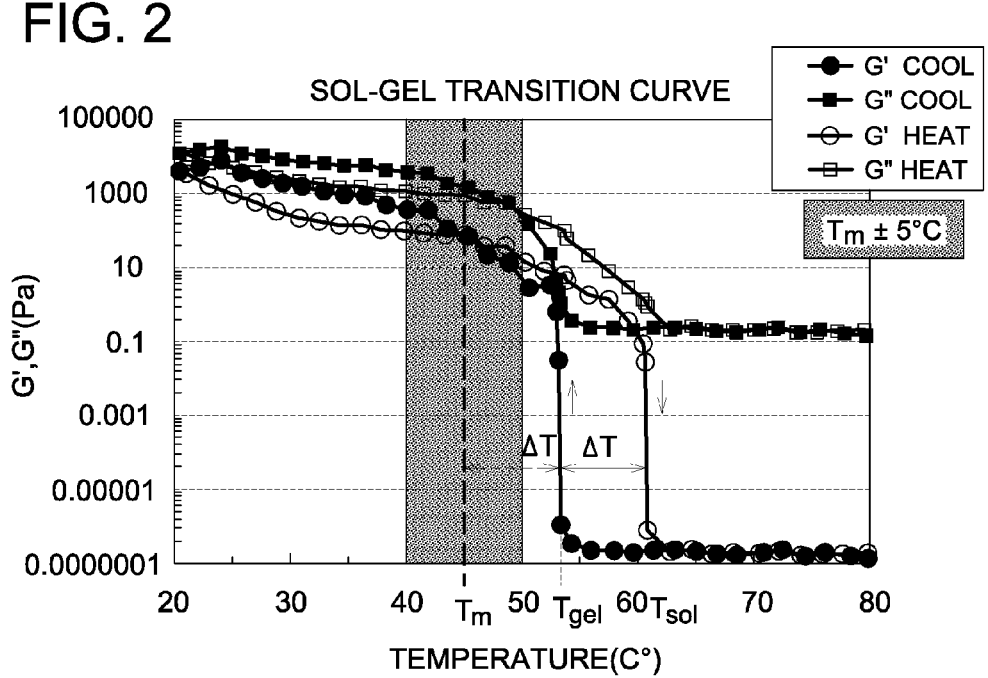
FIG. 2: Curve of dynamic viscoelasticity vs temperature change for actinic energy radiation curable ink (Ink No. 5).
Figure 3:
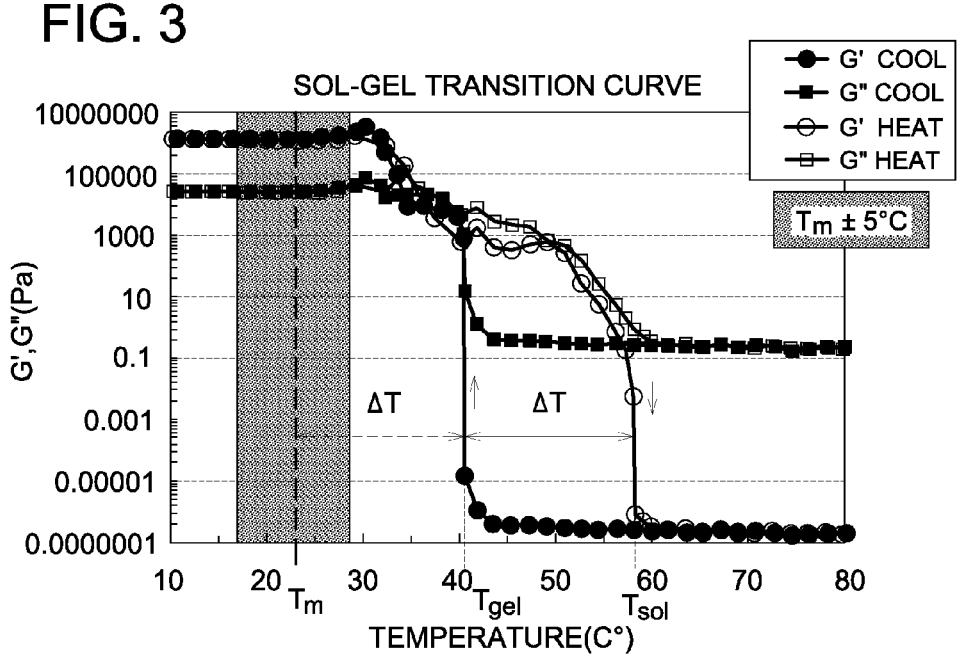
FIG. 3: Curve of dynamic viscoelasticity vs temperature change for actinic energy radiation curable ink (Ink No. 10).

The result of the actual measured temperature change of the dynamic viscoelasticity will be explained with reference to the accompanying FIGS. 1-3. Herein, FIGS. 1-3 show the measurement results of the actinic energy radiation curable ink used in Example 1 mentioned later. FIG. 1 represents the measurement result for Ink No. 2, FIG. 2 for Ink No. 5 and FIG. for Ink No. 10. The viscoelasticity curve under a temperature raising measurement (indicated as Heat in FIGs.) and the viscoelasticity curve under a temperature lowering measurement (indicated as Cool in FIGs.) are indicated. The temperature where G' decreases rapidly and reached to 0.1 Pa at the time of temperature raising is the solation temperature Tsol, and G' rises rapidly and reached to 0.1 Pa at the time of temperature lowering is gelation temperature Tgel. Each is indicated as Tsol and Tgel in FIGs., respectively. The difference of Tgel and Tsol, (Tgel−Tsol) is defined as ΔT, and is indicated as ΔT in FIGs. Herein, Tm is defined as a lower temperature than Tgel by ΔT, and the range of Tm ±5° C. according to the present invention is shown by the gray area. The actinic energy radiation curable inkjet ink shown in FIGS. 1 and 2 each has G' at temperature Tm in the range from not less than 0.1 Pa to less than 1,000 Pa and G' is smaller than G". Therefore they belong to the range of the present invention. However, the actinic energy radiation curable inkjet ink shown in FIG. 3 has G' of 1,000 Pa or more at temperature Tm and G' is larger than G". Therefore it does not belong to the range of the present invention. As the value of G", 5,000 Pa or less is preferable.

<Ink Composition>

Hereafter the ink composition of the actinic energy radiation curable ink used to the present invention will be explained.

(Gelling Agent)

A gelling agent used to the ink of the present invention may be a polymer compound or a low molecular compound. In view of an inkjet ejection, a low molecular compound is preferred.

The example of a gelling agent applicable to the present invention will now be specifically described with the reference to examples, however the present invention is not limited thereto.

Specific examples of high molecular compounds preferably applicable to the present invention include: fatty acid inulin such as stearic acid inulin; fatty acid dextrin such as palmitic acid dextrin and myristic acid dextrin (available from Chiba Flour Milling Co., Ltd. as Rheopearl series); glyceryl behenate eicosane diacid and polyglyceryl behenate eicosane diacid (available from Nisshin OilliO as Nomucoat series).

Specific examples of low molecular compounds preferably applicable to the present invention include: low molecular oil gelling agents described in JP-A Nos. 2005-126507, 2005-255821 and 2010-111790; amide compounds such as N-lauroyl-L-glutamic acid dibutyl amide and N-(2-ethyl hexanoyl)-L-glutamic acid dibutyl amide (available from Ajinomoto Fine Techno Co., Inc.); dibenzylidene sorbitols such as 1,3:2,4-bis-O-benzylidene-D-glucytol (Gelol D available from New Japan Chemical Co., Ltd.); petroleum based waxes such as paraffin wax, microcrystalline wax, and petro lactam; vegetable based waxes such as candelilla wax, carnauba wax, rice wax, Japan wax, jojoba oil, jojoba solid wax and jojoba ester; animal based waxes such as yellow beeswax, lanolin and whale wax; mineral based wax such as montan wax and hydrogenated wax; modified waxes such as hardened oil or hardened oil derivatives, montan wax derivative, paraffin wax derivative, microcrystalline wax derivative or polyethylene wax derivative; higher fatty acids such as behenic acid, arachidic acid, stearic acid, palmitic acid, myristic acid, lauric acid, oleic acid and erucic acid; higher alcohols such as stearyl alcohol and behenyl alcohol; hydroxy stearic acid such as 12-hydroxy stearic acid, 12-hydroxy stearic acid derivative; fatty acid amides such as lauric acid amide, stearic acid amide, behenic acid amide, oleic acid amide, erucic acid amide, recinoleic acid amide and 12-hydroxy stearic acid amide (for example, Nikka amide series produced by Nippon Kasei Chemical Co., Ltd. and ITOWAX series produced by ITO OIL CHEMICAL CO., LTD., FATTYAMID series produced by Kao Corp.); N-substituted fatty acid amides such as N-stearyl stearic acid amide and N-oleyl palmitic acid amide; special fatty acid amides such as N,N'-ethylene bis stearyl amide, N,N'-ethylene bis 12-hydroxy stearyl amide and N,N'-xylene bis stearyl amide; higher amines such as dodecyl amine, tetra-decyl amine or octadecyl amine; fatty acid ester compounds such as stearyl stearic acid, oleyl palmitic acid, glycerine fatty acid ester, sorbitan fatty acid ester, propylene glycol fatty acid ester, ethylene glycol fatty acid ester and polyoxyethylene fatty acid ester (for example, EMALLEX series produced by NIHON EMULSION Co., Ltd, Rikemal series produced by Riken Vitamin Co., Ltd., Poem series produced by Riken Vitamin Co., Ltd.); sucrose fatty acid esters such as sucrose stearic acid and sucrose palmitic acid (for example, Ryoto sugar ester series produced by MITSUBISHIKAGAKU FOODS CORPORATION); synthetic waxes such as polyethylene wax and α-olefin maleic anhydride copolymer wax; polymerized wax (UNILIN series produced by Baker-Petrolite), dimer acid, dimer diol (PRIPOR series produced by CRODA). Moreover, the above-mentioned gelling agent may be used independently or in combinations of at least two types.

The inkjet ink of the present invention contains the gelling agent, thereby it turns to be in the gel state after ejected from the inkjet recording head and deposited on the recording medium, resulting in preventing the collapse of the adjacent dots and achieving to form the high quality image at high speed printing. Then, the firm image film is formed by curing by the irradiation of the actinic energy radiation to fix on the recording medium. The content of the gelling agent is preferable in the range from not less than 1% by mass to less than 10% by mass, more preferable in the range from not less than 2% by mass to less than 7% by mass. In the case of less than 1% by mass, it may cause insufficient gel formation resulting in incompletely inhibition of the dot collapse; or the decrease of photo curability by oxygen inhibition in photo-radically cure system. In the case of exceeding 10% by mass, it may cause the increase of the non-cured component or the deterioration of the curability after the actinic energy radiation irradiation or the deterioration of the inkjet ejection.

(Physical Properties of Actinic Energy Radiation Curable Ink)

Temperature change characteristics of the dynamic viscoelasticity of the actinic energy radiation curable ink used by the present invention, the solation temperature Tsol and the gelation temperature Tgel can be suitably arranged by changing the kind of the gelling agent, the addition amount of the gelling agent and the kind of the actinic energy radiation curable monomer.

The actinic energy radiation curable ink of the present invention is characterized by having the storage elastic modulus G' at Tm of 0.1 Pa or more less than 1,000 Pa. Since the whole ink has fluidity in the case of G' of less than 0.1 Pa, it becomes difficult to inhibit the collapse of adjacent ink droplets and there is a problem of image quality degradation. On the other hand, since the solidification strength of the ink is too strong in the case of G' of 1,000 Pa or more, unevenness arose on the surface of the image on the recording medium and this caused the decrease of glossiness or the unnatural glittering glossiness in the image, resulting in a problem of decreasing the sense of homogeneous glossiness. Further, The actinic energy radiation curable ink of the present invention is characterized by having the storage elastic modulus G' at Tm smaller than the loss elastic modulus of G". In the case of so-called viscous gel in which G' is smaller than G", ink droplets may be properly leveled after deposition and sense of homogeneous glossiness can be obtained. However, in the case of so-called elastic gel in which G' is larger than G", even though G7 is in the range of from not less than 0.1 Pa to less than 1,000 Pa, since the elasticity is too strong to level the dots, and a sense of homogeneous glossiness may not be obtained.

The solation temperature Tsol of the actinic energy radiation curable ink used to the present invention is not limited in particular, but preferable not less than 40° C. and less than 90° C. In the case of Tsol being less than 40° C., since the temperature of the recording medium may be set at low temperature, thereby it may increase the apparatus load, or frost may occur in the apparatus. On the contrary, in the case of Tsol being not less than 90° C., since more energy is needed to solate the gelled ink, there is a problem that the running cost and environmental load of the apparatus become high, or the load to the inkjet recording head increases.

The difference ΔT between the solation temperature Tsol and the gelation temperature Tgel of the actinic energy radiation curable ink used to the present invention is not limited in particular, but is preferable not less than 3° C. and less than 20° C. In the case of ΔT being less than 3° C., since the gelation velocity becomes very quick, that is, the solidification velocity after deposition of the ink droplet becomes faster, thereby the surface unevenness changes with the minute change of the temperature and problem of changing the sense of homogeneous glossiness arises. Namely, the sense of homogeneous glossiness becomes low robustness and practically problematic. On the contrary, in the case of ΔT being not less than 20° C., since gelling velocity becomes slow, that is, the solidification velocity after deposition of ink droplet becomes slow, thereby it may fully be unable to prevent the image quality degradation by the collapse of the ink droplets even though the temperature of the recording medium being controlled in the range of the present invention.

(Actinic Energy Radiation Curable Composition)

In the ink of the present invention, it is characterized by containing the actinic energy radiation curable composite cured by the actinic energy radiation with the gelling agent and the colorant.

The actinic energy radiation curable composite (hereinafter also referred to as photopolymerizable compound) used for the present invention will be explained.

The actinic energy radiation according to the present invention includes, for example, electron beam, ultraviolet radiation, α rays, γ ray, and X-ray. In view of the danger to a human body, easiness for handling and spread industrially use, it is preferable ultraviolet radiation or electron beam. Especially ultraviolet radiation is preferable in the present invention.

The photopolymerizable compound which can be cross-linked or polymerize by the irradiation of the actinic energy radiation in the present invention is not limited in particularly. Of these, it is preferable to use a photo cationic polymerizable compound or a photo radical polymerizable compound.

(Cationic Polymerizable Compound)

According to the present invention, as the cationic polymerizable compound, various well-known cationic polymerizable monomers can be used. Of these, listed are a compound containing epoxy compound, vinylether compound and oxetane compound disclosed in, for example, JP-A Nos. 6-9714, 2001-31892, 2001-40068, 2001-55507, 2001-310938, 2001-310937 and 2001-220526.

In the present invention, in view of preventing shrinkage of the recording medium in case of curing ink, it is preferable to use at least one kind of oxetane compound and at least one compound selected from epoxy compound and vinyl ether compound as a photo cationic polymerizable compound.

As the aromatic epoxides, listed are di- or polyglycidyl ethers produced via reaction of a polyphenol having at least one aromatic nucleus or an alkylene oxide adduct thereof with epichlorohydrin. For example, cited are di- or polyglycidyl ethers of bisphenol A or an alkylene oxide adduct thereof, di- or polyglycidyl ethers of hydrogenated bisphenol A or an alkylene oxide adduct thereof, and novolac-type epoxy resins. Herein, as the alkylene oxide, ethylene oxide and propylene oxide can be listed.

As the alicyclic epoxides, listed are cyclohexene oxide- or cyclopentene oxide-containing compounds obtained by epoxidizing compounds having at least one cycloalkane ring such as cyclohexene or cyclopentene using an appropriate oxidant such as hydrogen peroxide or a peracid.

The aliphatic epoxides include, for example, di or polyglycidyl ethers of an aliphatic polyol or an alkylene oxide adduct thereof. Typical examples thereof include diglycidyl ethers of alkylene glycols such as ethylene glycol diglycidyl ether, propylene glycol diglycidyl ether, or 1,6-hexane diol diglycidyl ether; polyglycidyl ethers of polyols such as di- or triglycidyl ethers of glycerin or an alkylene oxide adduct thereof; and diglycidyl ethers of polyalkylene glycols such as diglycidyl ethers of polyethylene glycol or an alkylene oxide adduct thereof or diglycidyl ethers of polypropylene glycol or an alkylene oxide adduct thereof. Herein, as the alkylene oxides, ethylene oxide and propylene oxide can be listed.

In view of high curing rate, it is preferable aromatic epoxide and alicyclic epoxide, especially preferable alicyclic epoxide. In the present invention, these can be used individually or in combinations of at least 2 types.

A vinyl ether compound includes, for example, di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether and trimethylolpropane trivinyl ether; and monovinyl ether compounds such as ethyl vinyl ether, n-butyl vinyl ether, isobutyl vinyl ether, octadecyl ethyl vinyl ether, cyclohexyl vinyl ether, hydroxybutyl vinyl ether, 2-ethylhexyl vinyl ether, cyclohexane dimethanol monovinyl ether, n-propyl vinyl ether, isopropyl vinyl ether, isopropenyl vinyl ether-o-propylene carbonate, dodecyl vinyl ether, diethylene glycol monovinyl ether and octadecyl vinyl ether.

Among these vinyl ether compound, in view of curability, adhesion properties and surface hardness, preferred is di- or tri-vinyl ether compound, most preferred is divinyl ether compound. In the present invention, the vinyl ether compound may be used individually or in combinations of at least 2 types.

An oxetane compound utilizable in the present invention means a compound having an oxetane ring, and every oxetane compound well known in the art such as disclosed in JP-A Nos. 2001-220526 and 2001-310937 can be utilized.

When the compound having 5 or more oxetane rings is used as the oxetane compound used in the present invention, the viscosity of an ink composition tends to be high and results in difficulty in handling. Further, since the glass transition temperature of the ink composition becomes high, obtained cured material may tend not to have enough adhesion. It is preferable that the compound having 1-4 oxetane rings as the compound having oxetane ring used in the present invention.

As compounds having oxetane ring preferably used in the present invention, listed are the compound represented by Formula (1) described in paragraph (0089) of JP-A No. 2005-255821, the compound represented by Formula (2) described in paragraph (0092), the compound represented by Formula (7) described in paragraph (0107), the compound represented by Formula (8) described in paragraph (0109), and the compound represented by Formula (9) described in paragraph (0166) of the same JP-A.

As the specific compounds listed are Exemplified compounds 1-6 described in paragraphs (0104)-(0119) and the compound in paragraph (0121) of the same JP-A.

(Radical Polymerizable Compound)

Subsequently radical polymerizable compounds will be explained.

As photo radical polymerizable monomer, various kinds of well-known radical polymerizable monomer can be used. For example, known are photo curable materials using a photo polymerizable composition and cationic polymerizable photo curable resins described in each of JP-A No. 7-159983, JP-B No. 7-31399, JP-A Nos. 8-224982, and 10-863. Recently, cationic polymerizable photo curable resin which was sensitized to the longer wavelength region than visible light is disclosed, for example in JP-A Nos. 6-43633 and 8-324137.

A radical polymerizable compound is a compound which has radical polymerizable ethylenically unsaturated bond. As long as it is a compound which has at least one radical polymerizable ethylenically unsaturated bond in a molecule, any kind of compound may be used including chemical forms such as monomer, oligomer and polymer. A radical polymerizable compound may be employed individually or in combinations of at least two types by arbitrary ratios, in order to improve the targeted characteristics.

Specific examples of the radical polymerizable ethylenically unsaturated bond include: unsaturated carboxylic acids and salts thereof such as acrylic acid, methacrylic acid, itaconic acid, crotonic acid, isocrotonic acid and maleic acid; radical polymerizable compounds such as, ester, urethane, amide or anhydride, acrylonitrile, styrene, further various unsaturated polyester, unsaturated polyether, unsaturated polyamide, and unsaturated urethane.

As radical polymerizable compound of the present invention, all well-known (meta)acrylate monomers and/or oligomers can be used. In the present invention, "and/or" means that it may be a monomer or an oligomer, and further means that both may be included. Moreover, it is the same also about the matter described below.

Compounds having (meth)acrylate group include: monofunctional monomer such as isoamyl acrylate, stearyl acrylate, lauryl acrylate, octyl acrylate, decyl acrylate, isomyristyl acrylate, isostearyl acrylate, 2-ethylhexyl-diglycol acrylate, 2-hydroxybutyl acrylate, 2-acryloyl hexahydro phthalic acid, butoxyethyl acrylate, ethoxy diethyleneglycol acrylate, methoxy diethyleneglycol acrylate, methoxy polyethyleneglycol acrylate, methoxy propyleneglycol acrylate, phenoxyethyl acrylate, tetrahydrofurfuryl acrylate, isobonyl acrylate, 2-hydroxyethyl acrylate, 2-hydroxypropyl acrylate, 2-hydroxyl-3-phenoxypropyl acrylate, 2-acryloyloxyethyl succinic acid, 2-acryloyloxyethyl phthalic acid, 2-acryloyloxyethyl-2-hydroxyethyl-phthalic acid, lactone modified flexible acrylate, and t-butylcyclohexyl acrylate; bifunctional monomer such as triethylneglycol diacrylate, tetraethylneglycol diacrylate, polyethylneglycol diacrylate, tripropylneglycol diacrylate, polypropylneglycol diacrylate, 1,4-butanediol diacrylate, 1,6-hexanediol diacrylate, 1,9-nonanediol diacrylate, neopentylglycol diacrylate, dimethylol-tricyclodecane diacrylate, diacrylate of propyleneoxide adduct with bisphenol-A, hydroxyl pivalic acid neopentylglycol diacrylate, and polytetramethyleneglycol diacrylate; and multi-functional monomer more than trifunctional such as trimethylolpropane triacrylate, pentaerythritol triacrylate, pentaerythritol tetraacrylate, dipentaerythritol hexaacrylate, ditrimethylolpropane tetraacrylate, glycerinpropoxy triacrylate, caprolactone modified trimethylolpropane triacrylate, pentaerythritol ethoxy tetraacrylate, and caprolactam modified dipentaerythritol hexaacrylate. Further polymerizable olygomers can be usable as same as monomers. Example of polymerizable olygomer includes epoxy acrylate, aliphatic urethane acrylate, aromatic urethane acrylate, polyester acrylate, and linear acryl olygomer. Moreover, radical polymerizable or cross-linkable monomer, oligomer and polymer available in the market or well-known in the art may be applicable which are described specifically in "Hand book of Cross linking agent" edited by Yamashita Shinzo (1981, Taiseisha); "Hand book of UV and EB curing (Material)" edited by Kato Kiyoshi (1985, Kobunshi-kanko-kai), "Application and Market of UV and EB curing technologies" page: 79, edited by Rad Tech Kenkyu-kai (1989, CMC), and "Hand book of polyester resin" edited by Takiyama Eiichi (1988, Nikkan Kogyou Shinbunsha).

In view of sensitization, irritating to skin and eye, mutagenicity and toxicity, among above monomers, preferred is isoamyl acrylate, stearyl acrylate, lauryl acrylate, octyl acrylate, decyl acrylate, isomyristyl acrylate, isostearyl acrylate, ethoxy diethyleneglycol acrylate, methoxy diethyleneglycol acrylate, methoxy polyethyleneglycol acrylate, methoxy propyleneglycol acrylate, isobonyl acrylate, lactone modified flexible acrylate, tetraethylene glycol diacrylate, polyethylene glycol diacrylate, poly propylene glycol diacrylate, dipentaerythritol hexaacrylate, ditrimethylolpropane tetraacrylate, glycerinpropoxy triacrylate, caprolactone modified trimethylolpropane triacrylate, pentaerythritol ethoxy tetraacrylate, and caprolactam modified dipentaerythritol hexaacrylate.

Of these, preferred are: stearyl acrylate, lauryl acrylate, isostearyl acrylate, ethoxy diethyleneglycol acrylate, isobonyl acrylate, lactone modified flexible acrylate, tetraethylene glycol diacrylate, glycerinpropoxy triacrylate, caprolactone modified trimethylolpropane triacrylate, and caprolactam modified dipentaerythritol hexaacrylate.

In the present invention, vinyl ether monomer and/or oligomer and (meth)acrylate monomer and/or oligomer may be used in combination as polymerizable compound. As examples of vinyl ether monomers, listed are di- or trivinyl ether compound such as ethylene glycol divinyl ether, diethylene glycol divinyl ether, triethylene glycol divinyl ether, propylene glycol divinyl ether, dipropylene glycol divinyl ether, butanediol divinyl ether, hexane diol divinyl ether, cyclohexane dimethanol divinyl ether and trimethylolpropane trivinyl ether; mono vinylether compounds such as ethyl vinyl ether, n-butyl vinyl ether, isobutyl vinyl ether, octadecyl vinyl ether, cyclohexyl vinyl ether, hydroxybutyl vinyl ether, 2-ethyl hexyl vinyl ether, cyclohexane dimethanol monovinyl ether, n-propyl vinyl ether, isopropyl vinyl ether, iso propenyl ether-o-propylene carbonate, dodecyl vinyl ether, diethylene glycol mono-vinyl ether and octadecyl vinyl ether. In the case of using vinyl ether oligomer, it is preferable to use the vinyl ether compound having molecular weight of 300-1,000 and bi-functional vinyl ether compound which has 2-3 ester groups in the molecule. For example, VEctomer 4010, VEctomer 4020, VEctomer 4040, VEctomer 4060, and VEctomer 5015, available as VEctomer series of ALDRICH are preferably listed but not limited thereto.

Moreover, in the present invention, it is also possible to use various vinyl ether compounds in combination with maleimide compound as polymerizable compound. As maleimides compound, for example, listed are: N-methyl maleimide, N-propyl maleimide, N-hexyl maleimide, N-lauryl maleimide, N-cyclohexyl maleimide, N-phenyl maleimide, N,N'- methylene bis maleimide, polypropylene glycol-bis(3-maleimide propyl)ether, tetraethylene glycol-bis(3-maleimide propyl) ether, bis(2-maleimide ethyl) carbonate, N,N'-(4,4'-diphenylmethane) bis maleimide, N,N'-2,4-trilene bis maleimide, or multi-functional maleimide compound which is ester compound of maleimide carboxylic acid indicated in JP-A No. 11-124403 and various polyols, but it is not limited thereto.

The amount of addition of the above-mentioned cationic polymerizable compound and radical polymerizable compound is preferably 1-97% by mass, more preferably 30-95% by mass.

(Constituents of Ink)

Subsequently each constituent about the ink of the present invention excluding the above-mentioned items will be detailed.

(Colorant)

As a colorant in the ink of the present invention, dye or pigment is used without any limitation. Pigment having good dispersion stability to ink components and excellent fastness is preferred. As pigments, organic or inorganic pigments described in color index below are usable without specifically limitation.

Examples of pigments for red or magenta include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, and 88, and Pigment Orange 13, 16, 20, and 36.

Examples of pigments for blue or cyan include Pigment Blue 1, 15, 15:1, 15:2, 15:3, 15:4, 15:6, 16, 17-1, 22, 28, 29, 36, and 60.

Examples of pigments for green include Pigment Green 7, 26, 36, and 50.

Examples of pigments for yellow include Pigment Yellow 1, 3, 12, 13, 14, 17, 34, 35, 37, 55, 74, 81, 83, 93, 95, 97, 108, 109, 110, 137, 138, 139, 153, 154, 155, 157, 166, 167, 168, 180, 185, and 193.

Examples of pigments for black include Pigment Black 7, 28, and 26.

Specific product name include: Chromo Fine Yellow 2080, 5900, 5930; AF-1300, 2700L; Chromo Fine Orange 3700L, 6730; Chromo Fine Scarlet 6750; Chromo Fine Magenta 6880, 6886, 6891N, 6790, 6887; Chromo Fine Violet RE; Chromo Fine Red 6820, 6830; Chromo Fine Blue HS-3, 5187, 5108, 5197, 5085N, SR-5020, 5026, 5050, 4920, 4927, 4937, 4824, 4933GN-EP, 4940, 4973, 5205, 5208, 5214, 5221, 5000P; Chromo Fine Green 2GN, 2GO, 2G-550D, 5310, 5370, 6830; Chromo Fine Black A-1103; Seika Fast Yellow 10GH, A-3, 2035, 2054, 2200, 2270, 2300, 2400(B), 2500, 2600, ZAY-260, 2700(B), 2770; Seika Fast Red 8040, C405(F), CA120, LR-116, 1531B, 8060, 1547, ZAW-262, 1537B, GY, 4R-4016, 3820, 3891, ZA-215, Seika Fast Caroline 6B1476T-7, 1483LT, 3840, 3870; Seika Fast Bordeaux 10B-430; Seika Light Rose R40, Seika Light Violet B800, 7805; Seika Fast Maroon 460N; Seika Fast Orange 900, 2900; Seika Light Blue C718, A612; Cyanine Blue 4933M, 4933GN-EP, 4940, 4973 (above compounds are produced by Dainichiseika Colour & Chemicals Mfg. Co., Ltd.); KET Yellow 401, 402, 403, 404, 405, 406, 416, 424; KET Orange 501; KET Red 301, 302, 303, 304, 305, 306, 307, 308, 309, 310, 336, 337, 338, 346; KET Blue 101, 102, 103, 104, 105, 106, 111, 118, 124; KET Green 201 (above compounds are produced by Dainippon Ink and Chemicals, Inc.); Colortex Yellow 301, 314, 315, 316, P-624, 314, U10GN, U3GN, UNN, UA-414, U263; Finecol Yellow T-13, T-05; Pigment Yellow 1705; Colortex Orange 202, Colortex Red 101, 103, 115, 116, D3B, P-625, 102, H-1024, 105C, UFN, UCN, UBN, U3BN, URN, UGN, UG276, U456, U457, 105C, USN; Colortex Maroon 601; Colortex Brown B610N; Colortex Violet 600; Pigment Red 122; Colortex Blue 516, 517, 518, 519, A818, P-908, 510; Colortex Green 402, 403; Colortex Black 702, U905 (above compounds are produced by Sanyo Color Works, Ltd.); Lionol Yellow 1405G, Lionol Blue FG7330, FG7350, FG7400G, FG7405G, ES, ESP-S (above compounds are produced by TOYO INK MFG. CO., LTD); Toner Magenta E02, Permanent Rubin F6B, Toner Yellow HG, Permanent Yellopw GG-02, Hostapeam Blue B2G (Above compounds are produced by Hoechst Industry); Novoperm P-HG, Hostperm Pink E, Hostperm Blue B2G (above compounds are produced by Clariant); Carbon black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, CF9 (above compounds are produced by Mitsubishi Chemical Corporation).

For dispersion of the above-described pigment, such as a ball mill, a sand mill, an attritor, a roll mill, an agitator, a Henschel mixer, a colloidal mill, an ultrasonic homogenizer, a pearl mill, a wet-type jet mill and a paint shaker can be utilized.

Further, at the time of dispersion of pigment, a dispersant can be added. As a dispersant, a polymer dispersant is preferably utilized, and a polymer dispersant includes such as SOLSPERSE series of Avecia Corp. and PB series of Ajinomoto Fine-Techno Co., Inc. Furthermore, the following are listed.

As pigment dispersants, listed are a hydroxyl group-containing carboxylic acid ester, a salt of a long-chain polyaminoamide and a high molecular weight acid ester, a salt of a high molecular weight polycarboxylic acid, a salt of a long-chain polyaminoamide and a polar acid ester, a high molecular weight unsaturated acid ester, a copolymer, a modified polyurethane, a modified polyacrylate, a polyether ester-type anionic surfactant, a naphthalenesulfonic acid formalin condensate salt, an aromatic sulfonic acid formalin condensate salt, a polyoxyethylene alkyl phosphoric acid ester, a polyoxyethylene nonylphenyl ether, stearyl amine acetate, and a pigment derivative.

Specific examples of the dispersants include "Anti-Terra-U (a polyaminoamide phosphoric acid salt)," "Anti-Terra-203/204 (a high molecular weight polycarboxylic acid salt)," "Disperbyk-101 (a polyaminoamide phosphoric acid salt and an acid ester), 107 (a hydroxyl group-containing carboxylic acid ester), 110 (an acid group-containing copolymer), 130 (a polyamide), 161, 162, 163, 164, 165, 166, and 170 (a copolymer)," "400," "Bykumen (a high molecular weight unsaturated acid ester)," "BYK-P104, P105 (a high molecular weight unsaturated acid polycarboxylic acid)," "P104S, 240S (a high molecular weight unsaturated acid polycarboxylic acid and a silicon-base)," and "Lactimon (a long-chain amine, an unsaturated acid polycarboxylic acid, and silicon)" produced by BYK Chemie GmbH.

Further, listed are "Efka 44, 46, 47, 48, 49, 54, 63, 64, 65, 66, 71, 701, 764, and 766" and "Efka Polymer 100 (a modified polyacrylate), 150 (an aliphatic modified polymer), 400, 401, 402, 403, 450, 451, 452, 453 (a modified polyacrylate), and 745 (a copper phthalocyanine-base)" produced by Efka Chemicals Co.; "Flowlen TG-710 (a urethane oligomer)," "Flownon SH-290 and SP-1000," and "Polyflow No. 50E and No. 300 (an acrylic copolymer)" produced by Kyoeisha Chemicals Co., Ltd.; and "Disparlon KS-860, 873SN, and 874 (a polymer dispersant), #2150 (an aliphatic polycarboxylic acid), and #7004 (a polyether ester-type)" produced by Kusumoto Chemicals, Ltd.

Still further, listed are "Demol RN, N (a naphthalenesulfonic acid formalin condensate sodium salt), MS, C, SN-B (an aromatic sulfonic acid formalin condensate sodium salt), and EP," "Homogenol L-18 (a polycarboxylic acid-type polymer)," "Emulgen 920, 930, 931, 935, 950, and 985 (a polyoxyethylene nonyl phenyl ether)," and "Acetamin 24 (a coconut amine acetate) and 86 (a stearylamine acetate)" produced by Kao Corp.; "Solsperse5000 (a phthalocyanine ammonium salt-base), 13240, 13940 (a polyester amine-base), 17000 (a fatty acid amine-base), 24000, and 32000" produced by Zeneca Co.; "Nikkol T106 (a polyoxyethylene sorbitan monooleate)," "MYS-IEX (a polyoxyethylene monostearate)," and "Hexagline 4-0 (a hexaglyceryl tetraoleate)" produced by Nikko Chemicals Co., Ltd.

These pigment dispersants are preferably contained at 0.1-20% by mass in the ink. Further, a synergist as a dispersion aid may be employed depending on various types of pigment. These dispersants and dispersion aids are preferably added at 1-50 parts by mass based on 100 parts by mass of pigment. As a dispersion medium, a solvent or a polymerizable compound is utilized; however, in a non-solvent type actinic energy radiation curable ink composition of the present invention, non-solvent is preferable for curing reaction immediately after printing. When a solvent remains in a cured image, there caused deterioration of solvent resistance and a problem of VOC of a residual solvent. Therefore, it is preferable to select not a solvent but a polymerizable compound as a dispersion medium, and more preferably to select monomer having the lowest viscosity among them, with respect to dispersion adaptability.

Pigment particles preferably have an average particle size of 0.08-0.5 μm. The pigment, the dispersant and the dispersion medium are selected and the distributed conditions and filtration conditions are properly determined so that the maximum particle size becomes 0.3-10 μm, preferably 0.3-3 μm. As the result of these particle size controls, clogging at head nozzles can be inhibited and ink storage stability, ink transparency, curing sensitivity can be maintained.

Further with respect to the ink of the present invention, well-known dye, preferably an oil soluble dye may be used, as appropriate. Specific examples of oil soluble dyes are described below; however the present invention is not limited thereto.

(Magenta Dye)

Specific examples of magenta dye include MS Magenta VP, MS magenta HM-1450, HM Magenta HSo-147 (products of Mitsui-Toatsu Chemicals), AIZEN SOT Red-1, AIZEN SOT Red-2, AIZEN SOT Red-3, AIZEN SOT Pink-1, SPIRON Red GEH SPECIAL (products of Hodogaya Chemical), RESOLIN Red FB 200%, MACROLEX Red Violet R, MACROLEX ROTSB (products of Bayer Japan), KAYASET Red B, KAYASET Red 130, KAYASET Red 802 (products of Nippon Kayaku), PHLOXIN, ROSE BENGAL, ACID Red (products of Daiwa Kasei), HSR-31, DIARESIN Red K (products of Mitsubishi-Kasei), and Oil Red (product of BASF Japan).

(Cyan Dye)

Specific examples of Cyan dye include MS Cyan HM-1238, MS Cyan HSo-16, HM Cyan HSo-144, MS Cyan VPG (products of Mitsui-Toatsu Chemical), AIZEN SOT Blue-4 (product of Hodogaya Chemical), RESOLIN BR. Blue BGLN 200%, MACROLEX Blue RR, CERES Blue GN, SIRIUS SUPRA TURQ. Blue Z-BGL, SIRIUS SUPRA TURQ. Blue FB-LL 330% (products of Bayer Japan), KAYASET Blue FR, KAYASET Blue N, KAYASET Blue 814, Turq. Blue GL-5 200, Light Blue BGL-5 200 (products of Nippon Kayaku), DAIWA Blue 7000, Olosol Fast Blue GL (products of Daiwa Kasei), DIARESIN Blue P (product of Mitsubishi-Kasei), SUDAN Blue 670, NEOPEN Blue 808, and ZAPON Blue 806 (products of BASF Japan).

(Yellow Dye)

Specific examples of yellow dye include MS Yellow HSM-41, Yellow KX-7, Yellow EX-27 (products of Mitsui-Toatsu Chemical), AIZEN SOT Yellow-1, AIZEN SOT Yellow-3, AIZEN SOT Yellow-6 (products of Hodogaya Chemical), MACROLEX Yellow 6G, MACROLEX FLUOR. Yellow 10GN (products of Bayer Japan), KAYASET Yellow SF-G, KAYASET Yellow 2G, KAYASET Yellow A-G, KAYASET Yellow E-G (products of Nippon Kayaku), DAIWA Yellow 330HB (product of Daiwa Kasei), HSY-68 (product of Mitsubishi-Kasei), SUDAN Yellow 146, and NEOPEN Yellow 075 (products of BASF Japan).

(Black Dye)

Specific examples of Black dye include MS Black VPC (product of Mitsui-Toatsu Chemical), AIZEN SOT Black-5 (product of Hodogaya Chemical), RESORIN Black GSN 200%, RESORIN Black BS (products of Bayer Japan), KAYASET Black SF-G, KAYASET A-N (products of Nippon Kayaku), DAIWA Black MSC (product of Daiwa Kasei), HSB-202 (product of Mitsubishi-Kasei), NEPTUNE Black X60, and NEOPEN Black X58 (products of BASF Japan).

Addition amount of pigment or oil soluble dye is preferably in the range of 0.1-20% by mass, more preferably in the range of 0.4-10% by mass. Excellent image quality can be obtained by 0.1% by mass or more and ink can keep proper viscosity for ejecting by 20% by mass or less. Further, mixture of 2 or more colorants may be usable in combination properly for adjusting color.

(Photopolymerization Initiator)

In the ink of the present invention, when using ultraviolet radiation as an actinic energy radiation, it is preferable to contain at least one kind of photopolymerization initiators. However, in the case of using an electron beam as the actinic energy radiation, it sometimes does not need a photopolymerization initiator.

The photopolymerization initiator can be classified into two classes: intramolecular bond cleavage type and intramolecular hydrogen withdrawal type.

As the intramolecular bond cleavage type photopolymerization initiator, for example listed are: acetophenone based such as diethoxy acetophenone, 2-hydroxy-2-methyl-1-phenyl propane-one, benzyl dimethylketal, 1-(4-isopropyl phenyl)-2-hydroxy-2-methyl propane 1-one, 4-(2-hydroxy ethoxy) phenyl-(2-hydroxy-2-propyl) ketone, 1-hydroxy cyclohexyl phenyl ketone, 2-methyl-2-morpholino-(4-thio methylphenyl) propane 1-one, and 2-benzyl-2-dimethylamino-1-(4-morpholino phenyl)-butanone; benzoin based such as benzoin, benzoin methyl ether and benzoin isopropyl ether; acyl phosphine oxide based such as 2,4,6-trimethyl benzoin diphenyl phosphine oxide; benzyl, and methylphenyl glyoxy ester.

On the other hand as intramolecular hydrogen withdrawal type photopolymerization initiator, for example listed are: benzophenone based such as benzophenone, o-benzoyl benzoic acid methyl-4-phenyl benzophenone, 4,4'-dichloro benzophenone, hydroxy benzophenone, 4-benzoyl-4'-methyl-diphenyl sulfide, acrylated benzophenone, 3,3',4,4'-tetra-(t-butyl peroxy carbonyl) benzophenone; and 3,3'-dimethyl-4-methoxy benzophenone; thio xanthone based such as 2-isopropyl thioxanthone, 2,4-dimethyl thioxanthone, 2,4-diethyl thioxanethon, and 2,4-dichloro thioxanethon; amino benzophenone based such as Michler's ketone and 4,4'-diethylamino benzophenone; 10-butyl-2-chloro acridone, 2-ethyl anthraquinone, 9,10-phenanthrene quinone, and camphor quinine.

The amount of combination in the case of using a photopolymerization initiator is preferably in the range of 0.01-10.00% by mass of the actinic energy radiation curable composition.

As radical polymerization initiators, there are listed triazine derivatives described in JP-B Nos. 59-1281 and 61-9621 and JP-A 60-60104; organic peroxides described in JP-A Nos. 59-1504 and 61-243807; diazonium compounds described in JP-B Nos. 43-23684, 44-6413, 44-6413, and 47-1604, and U.S. Pat. No. 3,567,453 specification; organic azide compounds described in U.S. Pat. Nos. 2,848,328, 2,852,379, and 2,940,853 specifications; ortho-quinonediazides described in JP-B Nos. 36-22062, 37-13109, 38-18015, and 45-9610; various kinds of onium compounds described in JP-B 55-39162, JP-A 59-14023, and "Macromolecules," Vol. 10, page 1307 (1977); azo compounds described in JP-A 59-142205; metal allene complexes described in JP-A 1-54440, European Patent Nos. 109,851 and 126,712, and "J. Imag. Sci.," Vol. 30, page 174 (1986); (oxo)sulfonium organic boron complexes described in Japanese Patent Nos. 2711491 and 2803454; titanocenes described in JP-A 61-151197; transition metal complexes containing a transition metal such as ruthenium described in "Coordination Chemistry Review," Vol. 84, pages 85-277 (1988) and JP-A 2-182701; 2,4,5-triarylimidazole dimers and carbon tetrabromide described in JP-A 3-209477; and organic halogen compounds described in JP-A 59-107344. Any of these radical polymerization initiators is preferably contained in the range of 0.01-10 parts by mass, based on 100 parts by mass of a compound having a radical polymerizable ethylenically-unsaturated bond.

As a photopolymerization initiator usable for the ink of the present invention, well-known photolytically acid generating agents can be used.

As such a photolytically acid generating agent, any compound used, for example, for chemical sensitization-type photoresists and photo-cationic polymerization is used (refer to pages 187-192 of "Imaging Yo Yuki Zairyo (Organic Materials Used for Imaging Applications)" edited by Yuki Electronics Zairyo Kenkyukai published by Bunshin Shuppan (1993). Examples of compounds suitable for the present invention will now be listed.

Initially, there can be listed $B(C_6F_5)_4^-$, $PF_6^-$, $AsF_6^-$, $SbF_6^-$, and $CF_3SO_3^-$ salts of aromatic onium compounds such as diazonium, ammonium, iodonium, sulfonium, and phosphonium.

Specific examples of such onium compounds usable for the present invention are listed in paragraph (0132) of JP-A No. 2005-255821.

Secondly, sulfonated compounds generating sulfonic acid can be listed and specific compounds will now be exemplified. Specific examples are listed in paragraph (0136) of JP-A No. 2005-255821.

Thirdly, halides photolytically generating hydrogen halides are usable. Specific examples are listed in paragraph (0138) of JP-A No. 2005-255821.

Fourthly, iron-arene complexes can be listed in paragraph (0140) of JP-A No. 2005-255821.

[Other Additives]

Various additives other than described above may be usable in the actinic energy radiation curable ink according to the invention. Specific example of additives include a surfactant, a leveling agent, a matting agent, and a polyester type resin a polyurethane resin, a vinyl resin, an acryl resin, a rubber resin, and waxes for controlling film properties. Further, so as to improve storage stability, a basic organic compound such as a basic alkali metal compound, a basic alkali-earth metal compound and amine are usable.

<<Recording Mediums>>

There can be employed a variety of recording media in the image forming apparatus of the invention without limitation. Specific example include a paper based recording medium such as a plain paper used in copy, an art paper, a conventional non-coated paper, a coated paper both face coated by resin, various laminated papers, a synthetic paper and non-absorptive plastics and their films used in soft packaging. Examples of plastic film include PET film, OPS film, OPP film, ONY film, PVC film, PE film, and TAC film. Further, metals and glass are also applicable.

<Inkjet Image Forming Method>

Subsequently the inkjet image forming method of the present invention will be detailed.

(Ink Ejecting Conditions)

As for the inkjet image forming method of the present invention, it is preferable to heat the actinic energy radiation curable inkjet ink in the inkjet head in the range of from not less than Tsol+10° C. to less than Tsol+40° C. When the temperature of the ink in the recording head is less than Tsol+10° C., the ink may gel in the recording head or on the nozzle surface, and results in unstable inkjet ejection. On the other hand when the temperature of the ink in the recording head is more than Tsol+40° C., since it is necessary to heat the recording head to high temperature, it becomes heavy load to the recording head. Especially in the case of using a piezoelectric element for the recording head, it causes a problem to shorten the life of the recording head. Moreover in view of ejection stability, the ink viscosity is preferable not less than 3 mPa·s and less than 20 mPa·s at the temperature inside of the recording head.

Viscosity is measured by the stress control type rheometer using a cone plate Physica MCR series (produced by Anton Paar) at shear rate of 11.7 $s^{-1}$.

(Temperature Control of Recording Medium)

The present invention is characterized by controlling the temperature of the recording medium in the range of the present invention. As the temperature controlling means, for example, listed are a method for controlling the temperature in which the recording medium is controlled from the backside by preliminary providing the cooling and the heating device on the conveyance stand for fixing the recording medium or attached to the drum for fixation; a spraying a method in which cold or warm air is sprayed on the recording medium, a method in which a refrigerant or a heater is attached to the upper surface of the recording medium at fixed position on apparatus and the temperature is controlled by non-contact, a method using IR laser irradiation, or a method in which the recording medium is preliminary temperature controlled before inkjet recording. Since it is required to be kept the in-plate temperature uniform and enhance to the robustness to the temperature change, it is preferably a method in which the recording medium is temperature controlled from the backside. As the method for controlling the temperature, for example, it is preferably the method of attaching a Peltier element or a heater or the method in which refrigerant and cooling water are circulated.

Moreover in the present invention, it may provide an intermediate transfer medium such as a roller between the inkjet recording head and the recording medium. In the case of using the intermediate transfer medium, the temperature of the intermediate transfer medium is preferably controlled in the range of the present invention.

(Total Ink Film Thickness after Ink Deposition)

In the inkjet recording method of the present invention, after deposition of an ink onto a recording medium and then curing via irradiation of actinic energy radiation, the total ink film thickness is preferable 2-25 μm. Herein, the term "total ink film thickness" refers to the maximum value of ink film thickness of an image recorded on a recording medium. The meaning of the above total ink film thickness is the same as in cases in which recording is conducted via a single color inkjet recording method, as well as a 2-color superimposing (secondary color), 3-color superimposing, or 4-color superimposing (white ink base) inkjet recording method.

(Ejected Ink Droplet Size)

In the present invention, it is possible to change suitably a size of ink droplet ejected from each nozzle of the recording head according to a recording image. In the case of forming a highly precise image, it is preferable in the range of 1 pl to 10 pl.

(Actinic Energy Irradiation Condition after Forming Image)

In the inkjet image forming method of the present invention, it is preferable that actinic energy radiation are irradiated within 10 seconds after forming the image, and it is more preferable within 0.001 to 5 seconds, still more preferable within 0.01 to 2 seconds.

Further, it is also preferable that actinic energy radiation irradiation is divided into two stages, in view of inhibiting contraction of a recording medium which tends to occur during ink curing.

Figure 4A:
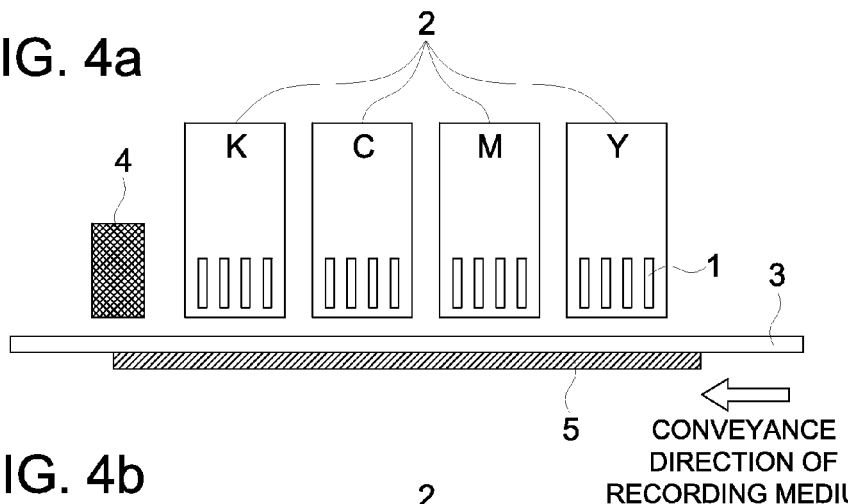
FIGS. 4(a) and 4(b): Line recording system Inkjet recording apparatus.
Figure 4B:
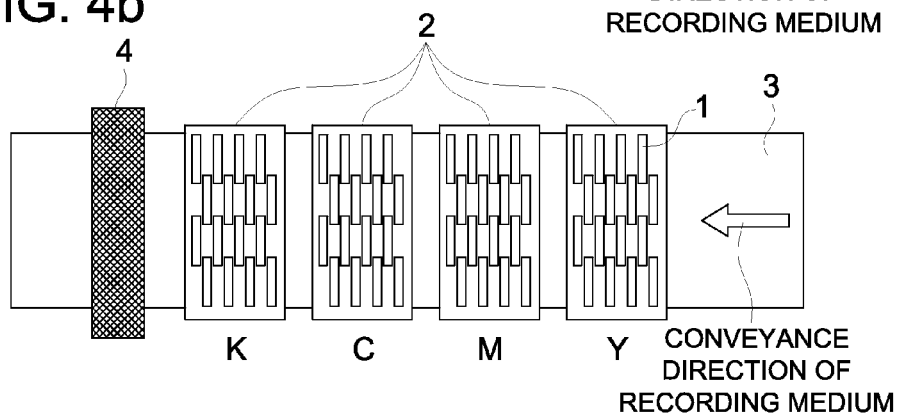

As the irradiation method of the actinic energy radiation, it is preferable to irradiate the actinic energy radiation after recording all the images. Namely, in the case of the inkjet recording apparatus of the line recording mode, as shown in FIG. 3, the actinic energy radiation irradiation unit will be attached behind all the recording heads. After an image recording is completed, it is preferable to irradiate the actinic energy radiation. In the case of the inkjet recording apparatus of a serial recording system, as shown in FIG. 4, after an image recording is completed in each pass, it is preferable to irradiate the actinic energy radiation. In the case of irradiating the actinic energy radiation before the image recording is completed, for example, in the case where a light source will be placed between colors in the line recording mode, or in the case where the image is recorded by thinning dots out and the actinic energy radiation is irradiated for every pass in the serial recording system, there occurs a case when an ink drop is flipped on a cured film and resulting in disturbing image quality or decreasing sense of homogeneous glossiness.

(Irradiation of Electron Beam)

The irradiation method of electron beam includes, for example, a scanning mode, a curtain beam mode and a broad beam mode, and a curtain beam mode is preferable with respect to a processing capacity.

By setting an acceleration voltage of electron beam in the range of 30-250 kV, cured film can be formed. Preferred is to set in the range of 30-100 kV in view of having the same curability with lower irradiation dose. Further, in the case of setting an acceleration voltage of electron beam in the range of 30-100 kV, by choosing lower irradiation doze than usual, both energy saving by high energy efficiency and enhancing production efficiency by high speed printing can be achieved. In the case of setting an acceleration voltage of electron beam in the range of 100-250 kV in the general electron beam irradiation, electron beam irradiation doze is preferably 30-100 kGy, more preferable 30-60 kGy.

As an electron beam irradiation apparatus, for example, listed are "CURETRON EBC-200-20-30" produced by Nisshin High Voltage Corp. or "Mini-EB" produced by AIT.

(Irradiation of Ultraviolet Radiation)

When using ultraviolet radiation as an actinic energy radiation, as the source of ultraviolet radiations, utilized are such as a fluorescence pipe (a low-pressure mercury lamp, a germicidal light), a cold cathode pipe, an ultraviolet laser, and a low pressure, medium pressure and high pressure mercury lamps having a operation pressure of from several 100 Pa to 1 MPa, a metal halide lamp, and LED. In view of curability, it is preferable a light source which can emit UV light having high illumination of 100 mW/cm$^2$ or more such as a high-pressure mercury lamp, a metal halide lamp, and LED. Of these, LED is especially preferable in view of low power consumption, but is not limited thereto.

(Inkjet Recording Apparatus)

Next, an inkjet recording apparatus which can be used for the inkjet image forming method of the present invention will now be described with reference to an ultraviolet radiation type apparatus as an example.

Hereafter, the recording apparatus which can be used for the inkjet recording method of the present invention will be described with appropriate reference to accompanying drawings. Herein, the recording apparatus illustrated in drawings is the preferred embodiment of the present invention, without being restricted to the drawings.

The image forming method of the line recording system will be described in which the constitution of the present invention becomes more effective.

FIG. 4 shows an example of the constitution of the main section of the inkjet recording apparatus. FIG. 4 (a) is the side view, and FIG. 4 (b) is the top view thereof.

The inkjet recording apparatus shown in FIG. 4 is referred to as the line recording system. A plurality of the recording heads 1 of individual colors are fixed and arranged on the head carriage 2 so as to cover entire width of the recording medium 3. The image is formed by conveying the recording medium under these fixed head carriage.

The number of recording heads for individual color used in the conveyance direction of the recording medium changes with the nozzle density of the used head and the printing resolution. For example, when the image having the resolution of 1440×1440 dpi is required by using the head having droplet size of 2 pl and the nozzle density of 360 dpi, it can be achieved by stagger-arranging 4 recording heads in the recording-medium conveyance direction. When the image having the resolution of 720×720 dpi is required by using the head having droplet size of 6 pl and the nozzle density of 360 dpi, it can be achieved by stagger-arranging 2 recording heads in the recording-medium conveyance direction. Herein, dpi is referred to as the number of dots per 2.54 cm in the present invention.

On the downstream side of the head carriage, ultraviolet radiation irradiation member 4 such as metal halide lamp or LED lamp is provided so as to cover the entire width of recording medium. Ultraviolet radiation is promptly irradiated with the lamp after forming the image, and the image is completely fixed.

Here in FIG. 4, water-cooled LED with 395 nm produced by Phoseon Technology is used, for example.

Further, the temperature controller unit 5 is provided beneath the recording medium, and the temperature of a recording medium can be suitably controlled to the temperature concerning the present invention.

In the present invention, it is preferable to form the image by ejecting small droplet having droplet size of 0.5-4.0 pl, in view of forming the high definition image.

Subsequently, the image forming method of the serial recording system will be described. FIG. 5 shows an example of the constitution of the main section of the inkjet recording apparatus.

The inkjet recording apparatus shown in FIG. 5 is referred to as a serial recording system, and a plurality of inkjet recording heads 1 of individual colors are fixed and arranged on recording head carriage 2. The head carriage forms the image by reciprocating from side to side along with the guide 6, and the recording medium 3 is conveyed to the conveyance direction for each pass of the head.

The number of passes for forming the image is not limited in particular. For example, the image can be formed by thinning out the dot by multi-passes such as 8 passes or 4 passes. However in the case of assuming a high-speed print, it is preferable to form the image with a single pass.

The number of recording heads for individual color used in the conveyance direction of the recording medium changes with the nozzle density of the used head, the printing resolution and the number of passes for recording. For example, when the image having the resolution of 1440×1440 dpi is required by using the head having droplet size of 2 pl and the nozzle density of 360 dpi, it can be achieved with a single pass by stagger-arranging 4 recording heads in the recording medium conveyance direction. When forming the image by the multi-pass of 4 or more passes, the image can be formed by using one recording head, and by shifting and recording a pixel for every pass.

On the downstream side of the head carriage, ultraviolet radiation irradiation member 9 such as metal halide lamp or LED lamp is provided via arrangement to cover the entire width of recording medium. Ultraviolet radiation is promptly irradiated with the lamp after forming the image, and the image is completely fixed.

Here in FIG. 5, water-cooled LED with 395 nm produced by Phoseon Technology is used, for example.

Further, the temperature controller 5 is provided beneath the recording medium, and the temperature of a recording medium can be suitably controlled to the temperature concerning the present invention.

EXAMPLES

The present invention will now specifically be described with reference to Examples that by no means limit the scope of the present invention.

Example 1

Preparation of Cationic Polymerization Inkjet Ink (Preparation of Pigment Dispersion 1)

Pigment was dispersed by the following composition.

The following two compounds were put into stainless beaker, heated, mixed and dissolved for 1 hour while heating at 65° C. by a hot plate.

Pigment dispersant: Ajisper PB824 (produced by Ajinomoto Fine-Techno Co., Inc.) 9 parts Polymerizable compound: OXT221 (Oxetane 221 produced by Toagosei Co., Ltd.) 70 parts After cooling to the room temperature, 21 parts of the following magenta pigment 1 was added, and put and sealed together with 200 g of zirconia beads having diameter of 0.5 mm into glass bottle. After milling for 8 hours by paint shaker, zirconia beads were eliminated and Pigment dispersion 1 was prepared.

Magenta pigment 1: Pigment Red 122 (Chromo Fine Red 6112JC produced by Dainichiseika Colour & Chemicals Mfg. CO., Ltd.)

(Preparation of Ink No. 1)

Following additives were added and mixed in order. After heating at 80° C. and mixing, obtained liquid was filtered via metal mesh filter of #3000 while heating, followed by cooling to prepare Ink No. 1.

| | |
|---|---|
| Polymerizable compound: OXT221 (oxetane 221 produced by Toagosei Co., Ltd.) | 44.0 parts |
| Polymerizable compound: Celoxide 2021P (alicyclic epoxy compound, produced by Daicel Chemical Industries, Ltd.) | 10.0 parts |
| Photopolymerization initiator: CPI-100P (50% propylene carbonate solution of triaryl sulfonium salt, produced by San-Apro Ltd.) | 5.0 parts |
| Sensitizer: DEA (diethoxy antrathene, produced by KAWASAKI KASEI CHEMICALS Ltd.) | 2.0 parts |
| Surfactant: X22-4272 (produced by Shin-Etsu Chemical Co., Ltd.) | 0.05 parts |
| Pigment dispersion 1 | 19.0 parts |

(Preparation of Ink No. 2)

Ink No. 2 was prepared in the same manner as Ink preparation of Ink 1, except for adding 5.0 parts of paraffin wax as a gelling agent and changing the content of OXT221 to 39.0 parts and the heating temperature during ink preparation to 100° C.

(Preparation of Ink Nos. 3-11)

Ink Nos. 3-11 were prepared in the same manner as Ink preparation of Ink 1, except for changing the kind and the content of each compound as described in Table 1 and changing heating temperature during ink preparation to 110° C.

Herein, additives described in abbreviated names in Table 1 are detailed below.

(Polymerizable Monomer)

OXT221: oxetane compound (di(1-ethyl-3-oxetanyl) methyl ether, produced by Toagosei Co., Ltd.)

Celoxide C2021P: alicyclic epoxy compound (3,4-epoxy cyclohexenyl methyl-3',4'-epoxy cyclohexene carboxylate, produced by Daicel Chemical Industries, Ltd.)

E-4030: Epoxy soybean oil produced by New Japan Chemical co., Ltd.

(Photopolymerization Initiator)

CPI-100P: 50% propylene carbonate solution of triaryl sulfonium salt, produced by San-Apro Ltd.

SP152: Adeka Optomer SP152 produced by ASAHI DENKA (Sensitizer)

DEA: diethoxy antrathene produced by KAWASAKI KASEI CHEMICALS Ltd.

(Surfactant)

X22-4272: polyether modified silicone at both terminal produced by Shin-Etsu Chemical Co., Ltd.

(Gelling Agent)

Paraffin: Paraffin wax (mp: 68-70° C.) produced by Wako Pure Chemical Industries, Ltd.

Micro crystalline: Hi-mic 2045 produced by Nippon Seiro Co., Ltd.

Distearyl ketone: Kao Wax T1 produced by Kao Corporation

Stearyl stearate: EXCEPARL SS produced by Kao Corporation

Jojoba ester: Floraester 70 produced by Floratech

LGBA: N-lauroyl-L-glutamic acid dibutyl amide (GP-1 produced by AJINOMOTO CO., INC.)

the temperature change of a dynamic viscoelasticity obtained under the temperature lowering measurement. The results obtained by the above-mentioned method are shown in Table 1. The temperature change curve of Ink No. 2 is shown in FIG. 1, Ink No. 5 in FIG. 2, and Ink No. 10 in FIG. 3, respectively.

TABLE 1

| | | Remarks | | | | | | | | | | |
|---|---|---|---|---|---|---|---|---|---|---|---|---|
| | | Comp. | Inv. | Inv. | Inv. | Inv. | Inv. | Comp. | Comp. | Comp. | Comp. | Comp. |
| | | Ink No. | | | | | | | | | | |
| | | 1 | 2 | 3 | 4 | 5 | 6 | 7 | 8 | 9 | 10 | 11 |
| Ink composition | OXT-221 | 43.9 | 38.9 | 39.0 | 39.0 | 38.9 | 42.1 | 31.9 | 43.2 | 39.0 | 24.0 | 48.0 |
| | Celoxide 2021P | 30.0 | 30.0 | 30.0 | 30.0 | 30.0 | 30.0 | 30.0 | 30.0 | 30.0 | 15.0 | |
| | E-4030 | | | | | | | | | | | 25.0 |
| | CPI-100P | 5.0 | 5.0 | 5.0 | 5.0 | 5.0 | 5.0 | 5.0 | 5.0 | 5.0 | 5.0 | |
| | SP152 | | | | | | | | | | | 5.0 |
| | DEA | 2.0 | 2.0 | 2.0 | 2.0 | 2.0 | 2.0 | 2.0 | 2.0 | 2.0 | 2.0 | |
| | X22-4272 | 0.1 | 0.1 | | | 0.1 | 0.1 | 0.1 | | | | |
| | Pigment dispersion 1 | 19.0 | 19.0 | 19.0 | 19.0 | 19.0 | 19.0 | 19.0 | 19.0 | 19.0 | 19.0 | 15.0 |
| Gelling agent | Paraffin | | 5.0 | | | | | 12.0 | | | | |
| | Microcrystalline | | | 1.5 | 0.5 | 0.5 | | | | | | |
| | Diaryl ketone | | | 3.5 | | | 1.8 | | | | | |
| | Stearyl stearate | | | | 4.5 | | | | | | | |
| | Jojoba ester | | | | | 4.5 | | | | | | |
| | LGBA | | | | | | | | | 0.8 | 5.0 | |
| | 12-hydroxy stearic acid | | | | | | | | | | 35.0 | |
| | Dibenzylidene sorbitol | | | | | | | | | | | 7.0 |
| Physical properties of Ink | Tsol | — | 67 | 65 | 49 | 61 | 54 | 70 | 62 | 96 | 58 | 105 |
| | Tgel | — | 59 | 55 | 42 | 54 | 47 | 68 | 40 | 61 | 41 | 58 |
| | ΔT | — | 8 | 11 | 6 | 8 | 7 | 2 | 22 | 35 | 18 | 47 |
| | Tm | — | 51 | 44 | 36 | 46 | 39 | 66 | 18 | 27 | 23 | 11 |
| | G' | — | 2.5 | 392 | 29 | 71 | 15 | 1,200 | 0.2 | 1,470,000 | 1,380,000 | 550,000 |
| | G" | — | 16 | 2,870 | 652 | 1,400 | 158 | 2,540 | 4.0 | 26,200 | 26,200 | 23,000 |

12-hydroxy stearic acid: Hydroxy stearine produced by Kawaken Fine Chemicals Co., Ltd.

Dibenzylidene sorbitol: 1,3:2,4-bis-O-benzylidene-D-glycitol (Gelol D produced by New Japan Chemical Co., Ltd.)

(Measurement of Each Property of Inks)

Dynamic viscoelasticity, gelling temperature and solation temperature of Ink Nos. 2-11 prepared above were measured according to the following evaluation method.

The ink of the present invention was set to the stress control type rheometer (Physica MCR300, produced by Anton Paar) which can control the temperature, heated at 100° C. and dynamic viscoelasticity was measured by cooling to 20° C. under a temperature lowering rate of 0.1° C./s, a strain of 5% and an angle frequency of 10 radian/s. Measurement was performed using the cone plate (CP75-1, produced by Anton Paar) having diameter of 75.033 mm in and cone angle of 1.017°. Moreover, the temperature was controlled by using Peltier device type temperature controller (TEK150P/MC1) attached to Physica MCR300. The gelation temperature Tgel is determined by the temperature when the storage elastic modulus G' reaches 0.1 Pa from the temperature change of the dynamic viscoelasticity. Then, the temperature change of a dynamic viscoelasticity is measured from 20° C. to 100° C. under a temperature raising rate of 0.1° C./s, a strain of 5% and an angle frequency of 10 radian/s. The solation temperature Tsol is determined by the temperature when the storage elastic modulus G' reaches 0.1 Pa. ΔT (=Tsol−Tgel) and Tm (=Tgel−ΔT) were calculated from the resulting values of Tsol and Tgel. Then, the storage elastic modulus G' and the loss elastic modulus G" at temperature Tm (° C.) were read from Example 2

Preparation of Radical Polymerizable Inkjet Ink (Preparation of Pigment Dispersion 2)

Pigment was dispersed by the following composition.

The following three compounds were put into stainless beaker, heated, mixed and dissolved for 1 hour while heating at 65° C. by a hot plate.

| | |
|---|---|
| Pigment dispersant: Ajisper PB824 (produced by Ajinomoto Fine-Techno Co., Inc.) | 9 parts |
| Polymerizable compound: APG-200 (tripropyleneglycol diacrylate produced by Shin-Nakamura Chemical Co., Ltd.) | 70 parts |
| Polymerization inhibitor: Irgastab UV10 (produced by BASF Japan) | 0.02 parts |

After cooling to the room temperature, 21 parts of the following magenta pigment 1 was added, and put and sealed together with 200 g of zirconia beads having diameter of 0.5 mm into glass bottle. After milling for 8 hours by paint shaker, zirconia beads were eliminated and Pigment dispersion 2 was prepared.

Magenta pigment 1: Pigment Red 122 (Chromo Fine Red 6112JC produced by Dainichiseika Colour & Chemicals Mfg. CO., Ltd.)

(Preparation of Ink No. 12)

Following additives were added and mixed in order. After heating at 80° C. and mixing, obtained liquid was filtered via metal mesh filter of #3000 while heating, followed by cooling to prepare Ink No. 12.

| | |
|---|---|
| Polymerizable compound: A-400 (polyethyleneglycol #400 diacrylate produced by Shin-Nakamura Chemical Co., Ltd.) | 35.0 parts |
| Polymerizable compound: SR494 (4EO modified pentaerhrytol tetraacrylate produced by SARTOMER) | 17.0 parts |
| Polymerizable compound: SR499 (6EO modified trimethylol propane triacrylate produced by SARTOMER) | 17.9 parts |
| Polymerization inhibitor: Irgastab UV10 (produced by BASF Japan) | 0.1 parts |
| Photopolymerization initiator: TPO (phosphine oxide, DAROCURE TPO, produced by BASF Japan) | 6.0 parts |
| Polymerization initiator auxiliary agent: ITX (isopropyl thioxanthone, Speedcure ITX, produced by Lambson) | 2.0 parts |
| Polymerization initiator auxiliary agent: EDB (amine auxiliary agent, Speedcure EDB, produced by Lambson) | 3.0 parts |
| Pigment dispersion 2 | 19.0 parts |

(Preparation of Ink Nos. 13-18)

Ink Nos. 13-18 were prepared in the same manner as Ink preparation of Ink 12, except for changing the species and the content of each compound as described in Table 2 and changing heating temperature during ink preparation to 100° C.

Herein, additives described in abbreviated names in Table 2 are detailed below.

(Polymerizable Monomer)

A-400: polyethyleneglycol #400 diacrylate produced by Shin-Nakamura Chemical Co., Ltd.

SR494: 4EO modified pentaerhrytol tetraacrylate produced by SARTOMER

SR499: 6EO modified trimethylol propane triacrylate produced by SARTOMER (Polymerization Inhibitor)

Irgastab UV10: produced by BASF Japan (Photopolymerization Initiator)

TPO: phosphine oxide (DAROCURE TPO, produced by BASF Japan)

(Polymerization Initiator Auxiliary Agent)

ITX: isopropyl thioxanthone (Speedcure ITX, produced by Lambson)

EDB: amine auxiliary agent (Speedcure EDB, produced by Lambson)

(Gelling Agent)

Glyceryl behenate: Poem B-100 produced by RIKEN VITAMIN Co., Ltd.

Behenic acid: LUNAC BA produced by Kao Corporation

Stearic acid amide: fatty acid amide T produced by Kao Corporation

N stearyl stearic acid amide: Nikka amide S produced by Nippon Kasei Chemical co., Ltd.

Glycerine monostearate: Rikemal VT-50 produced by RIKEN VITAMIN Co., Ltd.

Beheny ether (5 E.O.): polyoxyethylene behenylether (EMALEX BHA-5 produced by Nihon Emulsion Co., Ltd.)

(Measurement of Ink Properties)

Tsol, Tgel, ΔT, Tm, G' and G" of Ink Nos. 13-18 prepared above were measured according to the same method as described in Example 1. Results were shown in Table 2.

TABLE 2

| | | Remarks | | | | | | |
|---|---|---|---|---|---|---|---|---|
| | | Comp. | Inv. | Inv. | Inv. | Inv. | Inv. | Inv. |
| | | Ink No. | | | | | | |
| | | 12 | 13 | 14 | 15 | 16 | 17 | 18 |
| Ink composition | A-400 | 35.0 | 29.0 | 30.0 | 31.0 | 30.0 | 27.5 | 27.0 |
| | SR494 | 17.0 | 17.0 | 17.0 | 17.0 | 17.0 | 17.0 | 17.0 |
| | SR499 | 17.9 | 17.9 | 17.9 | 17.9 | 17.9 | 17.9 | 17.9 |
| | Irgastab UV10 | 0.1 | 0.1 | 0.1 | 0.1 | 0.1 | 0.1 | 0.1 |
| | ITX | 2.0 | 2.0 | 2.0 | 2.0 | 2.0 | 2.0 | 2.0 |
| | TPO | 6.0 | 6.0 | 6.0 | 6.0 | 6.0 | 6.0 | 6.0 |
| | EDB | 3.0 | 3.0 | 3.0 | 3.0 | 3.0 | 3.0 | 3.0 |
| | Pigment dispersion 2 | 19.0 | 19.0 | 19.0 | 19.0 | 19.0 | 19.0 | 19.0 |
| Gelling agent | Glyceryl behenate | | 6.0 | | | | | |
| | Behenic acid | | | 5.0 | | | | |
| | Stearic acid amide | | | | 4.0 | | | |
| | N stearyl stearic acid amide | | | | | 5.0 | | |
| | Glycerine monostearate | | | | | | 7.5 | |
| | Beheny ether (5 E.O.) | | | | | | | 8.0 |
| Physical properties of Ink | Tsol | — | 62 | 61 | 76 | 92 | 68 | 38 |
| | Tgel | — | 52 | 53 | 68 | 80 | 43 | 36 |
| | ΔT | — | 10 | 7 | 8 | 12 | 25 | 3 |
| | Tm | — | 42 | 46 | 60 | 68 | 18 | 33 |
| | G' | — | 195 | 246 | 536 | 0.5 | 151 | 171 |
| | G" | — | 521 | 769 | 1,420 | 3.4 | 263 | 252 |

Example 3

Evaluation of Images (Formation of Inkjet Image)

Magenta mono-color image was evaluated by using the head carriage for M by employing a line head printer of a line head system loaded with piezo type recording head as shown in FIG. 4.

Each of Inks 1-18 described in Examples 1 and 2 were employed into the inkjet recording heads. Onto Coated printing paper A (OK top Coat, basis weight of 128 g/m², produced by OJI PAPER), Coated printing paper B (New age, basis weight of 105 g/m², produced by OJI PAPER), PET laminated paper (Specialty 1621 produced by Gojo Paper MFG., Co., Ltd.), and polyethylene terephthalate film (White PET produced by MRUU SECCHAKU), outline character, solid image of 5 cm×5 cm, and density gradation patch were printed. Consequently, Image Nos. 1-74 corresponding to each Ink Nos. were obtained. Ink supply system comprises an ink tank, a feeding pipe, a pre-chamber ink tank just prior to the head, piping with filters, and a piezo head. Portion from the pre-chamber ink tank to recording head was thermally insulated and heated at a solation temperature of the ink which was determined in Examples 1 and 2+30° C. Further, by incorporating heater in piezo head, ink in the recording head was heated at a temperature described in Tables 3, 4 and 5. Print was carried out by using piezo head having 512 nozzles at a nozzle aperture diameter of 20 μm (256 nozzles×2 lines, arranged in zigzag alignment, and nozzle pitch in one line being 360 dpi), under conditions of an amount of one droplet of 2.5 pl, an ejected droplet speed of about 6 m/sec and a recording resolution of 1,440×1,440 dpi. Recording speed was 500 mm/s Temperature of each recording medium was kept at the temperature described in Tables 3, 4 and 5 by controlling the temperature via the temperature control unit 5. After forming the image, ink was cured by irradiating by ultraviolet radiation via LED lamp (produced by Phoseon Technology, 395 nm, water cooling LED) arranged at the downstream of the recording unit. Further, image formation described above was carried out under an ambient of 23° C. and 55% R.H. Herein, dpi as described in the present invention represents the number of dots per 2.54 cm.

(Evaluation of Formed Image)

Above formed images 1-74 were evaluated with respect to character quality, density unevenness, sense of homogeneous glossiness, abrasion resistance and ejection stability, according to the following method.

(Evaluation of Character Quality)

According to above method, onto Coated printing paper A (OK top Coat, basis weight of 128 g/m², produced by OJI PAPER), outline characters of ▢, ▣, ▨, ▩, ▤, ▥, ▦, ▧, ▨, ▩ by MS Mincho font character in 3 and 5 point each were printed with a recording resolution of 1,440×1,440 dpi, and the resulting characters were evaluated by visual examination based on the following criteria.

A: All of 3 point outline characters were recorded clearly in detail.

B: Only part of 3 point outline characters was legible, but all of 5 point characters were legible.

C: Some of 5 point outline characters were illegible.

(Evaluation of Density Unevenness)

According to above method, onto Coated printing paper A (OK top Coat, basis weight of 128 g/m², produced by OJI PAPER), Coated printing paper B (New age, basis weight of 105 g/m², produced by OJI PAPER), PET laminated paper (Specialty 1621 produced by Gojo Paper MFG., Co., Ltd.), and polyethylene terephthalate film (White PET produced by MRUU SECCHAKU), solid image of 5 cm×5 cm were printed. Image was visually evaluated and density unevenness was evaluated based on the following criteria.

A: No density unevenness was noticed in the image by observation from 15 cm distance.

B: Density unevenness was noticed in a part of the image by observation from 15 cm distance, but no density unevenness was noticed by observation from 30 cm distance.

C: Density unevenness was noticed in the image by observation from 30 cm distance.

(Evaluation of Sense of Homogeneous Glossiness)

According to above method, onto Coated printing paper A (OK top Coat, basis weight of 128 g/m², produced by OJI PAPER), Coated printing paper B (New age, basis weight of 105 g/m², produced by OJI PAPER), PET laminated paper (Specialty 1621 produced by Gojo Paper MFG., Co., Ltd.), and polyethylene terephthalate film (White PET produced by MRUU SECCHAKU), density gradation patch of 2 cm×2 cm with changing a dot rate in 0%, 10%, 20%, 30%, 50%, 70% and 100% were printed. Image was visually evaluated and sense of homogeneous glossiness was evaluated based on the following criteria. Herein, the dot rate refers to as a pixel density of the output data.

A: Uniform glossiness with sense of homogeneous glossiness was obtained in all dot rates and was comparable to an off-set printed matter.

B: Glitter or matted feeling appeared in the high density region such as dot rate of 70% to 100% was unpleasant, but practically non-problematic.

C: Remarkable glitter or matted feeling and uneven glossiness appeared in the high density region such as dot rate of 70% to 100% as well as remarkable decrease of glossiness in the medium density region such as dot rate of 20% to 50%.

(Evaluation of Abrasion Resistance)

According to above method, onto Coated printing paper A (OK top Coat, basis weight of 128 g/m², produced by OJI PAPER), solid image of 5 cm×5 cm was printed. Based on a method described in "JIS standard K5701-1 6.2.3 Abrasion Test", Coated printing paper A of suitable size was put on the formed image and was frictioned with load. Then, decrease of the image density was visually evaluated and abrasion resistance was evaluated based on the following criteria.

A: No change was noticed in the image after friction of 50 times or more.

B: Decrease of image density was observed after friction of 50 times, but practically non-problematic.

C: Obvious decrease of image density was observed after friction of less than 50 times, and practically problematic.

(Evaluation of Ejection Stability)

Ink was ejected by using the printer employing each of above prepared inks. Nozzle ejection failure and curved ejection was visually observed and ejection stability was evaluated based on the following criteria.

A: No nozzle ejection failure was observed.

B: At 1-4 nozzles among all of 512 nozzles, nozzle ejection failure was observed.

C: At 5 or more nozzles among all of 512 nozzles, nozzle ejection failure was observed.

Results were listed in Tables 3, 4 and 5.

TABLE 3

| Image No. | Ink No. | Tsol (° C.) | Tgel (° C.) | ΔT (° C.) | Tm (° C.) | *1 (° C.) | *2 (° C.) | *3 (° C.) | Character Quality *4 | Density unevenness *4 | | | | Sense of Homogeneous glossiness *4 | | | | Abrasion resistance *4 | Ejection stability | Remarks |
|---|---|---|---|---|---|---|---|---|---|---|---|---|---|---|---|---|---|---|---|---|
| | | | | | | | | | | | *5 | *6 | *7 | | *5 | *6 | *7 | | | |
| 1 | 1 | — | — | — | — | 25 | — | 80 | C | C | C | C | C | C | C | C | C | A | A | Comp. |
| 2 | 2 | 67 | 59 | 8 | 51 | 45 | −6 | 80 | A | A | A | A | A | C | C | C | C | A | A | Comp. |
| 3 | 2 | 67 | 59 | 8 | 51 | 47 | −4 | 75 | A | A | A | A | A | B | B | B | B | A | B | Inv. |
| 4 | 2 | 67 | 59 | 8 | 51 | 50 | −1 | 70 | A | A | A | A | A | A | A | A | A | A | B | Inv. |
| 5 | 2 | 67 | 59 | 8 | 51 | 51 | 0 | 80 | A | A | A | A | A | A | A | A | A | A | A | Inv. |

TABLE 3-continued

| Image No. | Ink No. | Tsol (°C.) | Tgel (°C.) | ΔT (°C.) | Tm (°C.) | *1 (°C.) | *2 (°C.) | *3 (°C.) | Character Quality *4 | Density unevenness *4 | | | | Sense of Homogeneous glossiness *4 | | | | Abrasion resistance *4 | Ejection stability | Remarks |
|---|---|---|---|---|---|---|---|---|---|---|---|---|---|---|---|---|---|---|---|---|
| | | | | | | | | | | *4 | *5 | *6 | *7 | *4 | *5 | *6 | *7 | | | |
| 6 | 2 | 67 | 59 | 8 | 51 | 55 | +4 | 75 | B | B | B | B | B | B | B | B | B | A | B | Inv. |
| 7 | 2 | 67 | 59 | 8 | 51 | 57 | +6 | 80 | C | C | C | C | C | B | B | C | C | A | A | Comp. |
| 8 | 3 | 65 | 55 | 11 | 44 | 37 | −7 | 60 | A | A | A | A | A | C | C | C | C | A | C | Comp. |
| 9 | 3 | 65 | 55 | 11 | 44 | 40 | −4 | 80 | A | A | A | A | A | B | B | B | B | A | A | Inv. |
| 10 | 3 | 65 | 55 | 11 | 44 | 44 | 0 | 80 | A | A | A | A | A | A | A | A | A | A | A | Inv. |
| 11 | 3 | 65 | 55 | 11 | 44 | 45 | +1 | 80 | A | A | A | A | A | A | A | A | A | A | A | Inv. |
| 12 | 3 | 65 | 55 | 11 | 44 | 48 | +4 | 80 | B | A | A | B | B | A | A | A | A | A | A | Inv. |
| 13 | 3 | 65 | 55 | 11 | 44 | 52 | +8 | 110 | C | C | C | C | C | C | B | C | C | A | C | Comp. |
| 14 | 4 | 49 | 42 | 6 | 36 | 28 | −8 | 80 | A | A | A | A | A | C | C | C | C | A | A | Comp. |
| 15 | 4 | 49 | 42 | 6 | 36 | 33 | −3 | 100 | A | A | A | A | A | B | B | B | B | A | B | Inv. |
| 16 | 4 | 49 | 42 | 6 | 36 | 36 | 0 | 80 | A | A | A | A | A | A | A | A | A | A | A | Inv. |
| 17 | 4 | 49 | 42 | 6 | 36 | 38 | +2 | 100 | A | A | A | A | A | A | A | A | A | A | B | Inv. |
| 18 | 4 | 49 | 42 | 6 | 36 | 40 | +4 | 100 | A | A | A | B | B | A | A | A | A | A | B | Inv. |
| 19 | 4 | 49 | 42 | 6 | 36 | 45 | +9 | 80 | C | C | C | C | C | C | C | C | C | A | A | Comp. |
| 20 | 5 | 61 | 54 | 8 | 46 | 40 | −6 | 80 | A | A | A | A | C | C | C | C | C | A | A | Comp. |
| 21 | 5 | 61 | 54 | 8 | 46 | 42 | −4 | 80 | A | A | A | A | A | A | A | B | B | A | A | Inv. |
| 22 | 5 | 61 | 54 | 8 | 46 | 44 | −2 | 80 | A | A | A | A | A | A | A | A | A | A | A | Inv. |
| 23 | 5 | 61 | 54 | 8 | 46 | 46 | 0 | 80 | A | A | A | A | A | A | A | A | A | A | A | Inv. |
| 24 | 5 | 61 | 54 | 8 | 46 | 50 | +4 | 80 | A | A | A | B | A | A | A | A | A | A | A | Inv. |
| 25 | 5 | 61 | 54 | 8 | 46 | 52 | +6 | 80 | C | C | C | C | C | B | B | B | B | A | A | Comp. |

*1: Temperature of Recording medium,
*2: Temperature of Recording medium − Tm,
*3: Temperature of Ejection
*4: Coated paper A,
*5: Coated paper B,
*6: Laminated paper,
*7: White PET

TABLE 4

| Image No. | Ink No. | Tsol (°C.) | Tgel (°C.) | ΔT (°C.) | Tm (°C.) | *1 (°C.) | *2 (°C.) | *3 (°C.) | Character Quality *4 | Density unevenness *4 | | | | Sense of homogeneous glossiness *4 | | | | Abrasion resistance *4 | Ejection stability | Remarks |
|---|---|---|---|---|---|---|---|---|---|---|---|---|---|---|---|---|---|---|---|---|
| | | | | | | | | | | *4 | *5 | *6 | *7 | *4 | *5 | *6 | *7 | | | |
| 26 | 6 | 54 | 47 | 7 | 39 | 32 | −7 | 70 | A | A | A | A | C | C | C | C | C | A | A | Comp. |
| 27 | 6 | 54 | 47 | 7 | 39 | 39 | 0 | 100 | A | A | A | B | B | A | A | A | A | A | B | Inv. |
| 28 | 6 | 54 | 47 | 7 | 39 | 43 | +4 | 70 | B | B | B | B | B | A | A | A | A | A | A | Inv. |
| 29 | 6 | 54 | 47 | 7 | 39 | 46 | +7 | 70 | C | C | C | C | C | C | C | C | C | A | A | Comp |
| 30 | 7 | 70 | 68 | 2 | 66 | 60 | −6 | 90 | A | A | A | B | B | C | C | C | C | C | C | Comp |
| 31 | 7 | 70 | 68 | 2 | 66 | 66 | 0 | 90 | B | B | B | C | C | B | B | C | B | C | C | Comp |
| 32 | 7 | 70 | 68 | 2 | 66 | 75 | +9 | 90 | C | C | C | C | C | C | C | C | C | C | C | Comp |
| 33 | 8 | 62 | 40 | 22 | 18 | 10 | −8 | 75 | C | B | B | C | C | C | C | B | B | A | A | Comp |
| 34 | 8 | 62 | 40 | 22 | 18 | 20 | +2 | 80 | C | C | C | C | C | B | B | B | B | A | A | Comp |
| 35 | 8 | 62 | 40 | 22 | 18 | 30 | +12 | 80 | C | C | C | C | C | C | C | C | C | A | A | Comp |
| 36 | 9 | 80 | 55 | 25 | 30 | 20 | −10 | 100 | A | A | A | A | C | C | C | C | C | B | A | Comp |
| 37 | 9 | 80 | 55 | 25 | 30 | 30 | 0 | 100 | B | B | A | B | B | C | C | C | C | B | A | Comp |
| 38 | 9 | 80 | 55 | 25 | 30 | 37 | +7 | 100 | C | C | C | C | C | C | C | C | C | B | A | Comp |
| 39 | 10 | 58 | 41 | 18 | 23 | 15 | −8 | 80 | C | C | B | C | C | C | C | C | C | C | C | Comp |
| 40 | 10 | 58 | 41 | 18 | 23 | 23 | 0 | 80 | C | C | B | C | C | C | B | C | C | C | C | Comp |
| 41 | 10 | 58 | 41 | 18 | 23 | 30 | +7 | 80 | C | C | C | C | C | C | C | C | C | C | C | Comp |
| 42 | 11 | 105 | 58 | 47 | 11 | 10 | −1 | 80 | B | B | B | C | C | C | C | C | C | A | C | Comp |
| 43 | 11 | 105 | 58 | 47 | 11 | 30 | +19 | 66 | C | C | C | C | C | C | C | C | C | A | B | Comp |
| 44 | 11 | 105 | 58 | 47 | 11 | 56 | +45 | 90 | C | C | C | C | C | C | C | C | C | A | B | Comp |
| 45 | 12 | — | — | — | — | 25 | — | 80 | C | C | C | C | C | C | C | C | C | A | A | Comp |
| 46 | 13 | 62 | 52 | 10 | 42 | 35 | −7 | 80 | A | A | A | A | C | C | C | C | C | A | A | Comp |
| 47 | 13 | 62 | 52 | 10 | 42 | 38 | −4 | 80 | A | A | A | A | A | A | B | B | A | A | Inv. |
| 48 | 13 | 62 | 52 | 10 | 42 | 42 | 0 | 80 | A | A | A | A | A | A | A | A | A | A | A | Inv. |
| 49 | 13 | 62 | 52 | 10 | 42 | 46 | +4 | 80 | B | B | B | B | B | A | A | A | A | A | A | Inv. |
| 50 | 13 | 62 | 52 | 10 | 42 | 48 | +6 | 80 | C | C | C | C | C | B | B | C | C | A | A | Comp |

*1: Temperature of Recording medium,
*2: Temperature of Recording medium − Tm,
*3: Temperature of Ejection
*4: Coated paper A,
*5: Coated paper B,
*6: Laminated paper,
*7: White PET

TABLE 5

| Image No. | Ink No. | Tsol (°C.) | Tgel (°C.) | ΔT (°C.) | Tm (°C.) | *1 (°C.) | *2 (°C.) | *3 (°C.) | Character Quality *4 | Density unevenness *4 | *5 | *6 | *7 | Sense of homogeneous glossiness *4 | *5 | *6 | *7 | Abrasion resistance *4 | Ejection stability | Remarks |
|---|---|---|---|---|---|---|---|---|---|---|---|---|---|---|---|---|---|---|---|---|
| 51 | 14 | 61 | 53 | 7 | 46 | 39 | −7 | 90 | A | A | A | A | A | C | C | C | C | A | A | Comp. |
| 52 | 14 | 61 | 53 | 7 | 46 | 42 | −4 | 110 | A | A | A | A | A | B | B | B | B | A | B | Inv. |
| 53 | 14 | 61 | 53 | 7 | 46 | 44 | −2 | 80 | A | A | A | A | A | A | A | A | A | A | A | Inv. |
| 54 | 14 | 61 | 53 | 7 | 46 | 46 | 0 | 100 | A | A | A | A | A | A | A | A | A | A | B | Inv. |
| 55 | 14 | 61 | 53 | 7 | 46 | 49 | +3 | 65 | A | A | A | B | B | A | A | A | A | A | B | Inv. |
| 56 | 14 | 61 | 53 | 7 | 46 | 52 | +6 | 90 | C | C | C | C | C | B | B | B | B | A | A | Comp. |
| 57 | 15 | 76 | 68 | 8 | 60 | 53 | −7 | 90 | A | A | A | A | A | C | C | C | C | A | A | Comp. |
| 58 | 15 | 76 | 68 | 8 | 60 | 57 | −3 | 90 | A | A | A | A | A | A | A | B | B | A | A | Inv. |
| 59 | 15 | 76 | 68 | 8 | 60 | 60 | 0 | 100 | A | A | A | A | A | A | A | A | A | A | A | Inv. |
| 60 | 15 | 76 | 68 | 8 | 60 | 64 | +4 | 100 | B | B | B | B | B | A | A | A | A | A | A | Inv. |
| 61 | 15 | 76 | 68 | 8 | 60 | 70 | +10 | 90 | C | C | C | C | C | C | C | C | C | A | A | Comp. |
| 62 | 16 | 92 | 81 | 11 | 69 | 60 | −9 | 110 | B | A | A | B | B | C | C | C | C | A | B | Comp. |
| 63 | 16 | 92 | 81 | 11 | 69 | 68 | −1 | 110 | B | B | A | B | B | A | A | B | B | A | B | Inv. |
| 64 | 16 | 92 | 81 | 11 | 69 | 72 | +3 | 100 | B | B | B | B | B | A | A | A | A | A | B | Inv. |
| 65 | 16 | 92 | 81 | 11 | 69 | 75 | +6 | 110 | C | C | C | C | C | B | B | B | B | A | B | Comp. |
| 66 | 17 | 68 | 43 | 25 | 18 | 10 | −8 | 80 | B | B | B | B | B | C | C | C | C | B | A | Comp. |
| 67 | 17 | 68 | 43 | 25 | 18 | 18 | 0 | 70 | B | B | B | B | B | A | A | B | B | B | B | Inv. |
| 68 | 17 | 68 | 43 | 25 | 18 | 20 | +2 | 80 | B | B | B | B | B | A | A | A | A | B | A | Inv. |
| 69 | 17 | 68 | 43 | 25 | 18 | 25 | +7 | 80 | C | C | C | C | C | B | B | B | B | A | A | Comp. |
| 70 | 18 | 38 | 36 | 3 | 33 | 26 | −7 | 70 | A | A | A | A | A | C | C | C | C | B | A | Comp. |
| 71 | 18 | 38 | 36 | 3 | 33 | 29 | −4 | 70 | B | A | A | B | B | B | B | B | B | B | A | Inv. |
| 72 | 18 | 38 | 36 | 3 | 33 | 30 | −3 | 80 | B | B | B | B | B | B | B | B | B | B | B | Inv. |
| 73 | 18 | 38 | 36 | 3 | 33 | 33 | 0 | 80 | B | B | B | B | B | B | A | A | A | B | B | Inv. |
| 74 | 18 | 38 | 36 | 3 | 33 | 40 | +7 | 70 | C | C | C | C | C | C | C | B | B | B | A | Comp. |

*1: Temperature of Recording medium,
*2: Temperature of Recording medium − Tm,
*3: Temperature of Ejection
*4: Coated paper A,
*5: Coated paper B,
*6: Laminated paper,
*7: White PET As can clearly seen from the results of Tables 3, 4 and 5, by using the actinic energy radiation curable inkjet inks of the present invention and by using the inkjet recording method, the formed image exhibits superior character quality, no image defect such as density unevenness on the various recording medium such as coated paper or film, sense of homogeneous glossiness, and excellent abrasion resistance as well as high ejection stability comparing to Comparative Examples.

Example 4

Evaluation of Color Image (Preparation of Pigment Dispersions 3 to 6)
Pigment was dispersed by the following composition.
The following three compounds were put into stainless beaker, heated, mixed and dissolved for 1 hour while heating at 65° C. by a hot plate.

| | |
|---|---|
| Pigment dispersant: Ajisper PB824 (produced by Ajinomoto Fine-Techno Co., Inc.) | 9 parts |
| Polymerizable compound: APG-200 (tripropyleneglycol diacrylate produced by Shin-Nakamura Chemical Co., Ltd.) | 70 parts |
| Polymerization inhibitor: Irgastab UV10 (produced by BASF Japan) | 0.02 parts |

After cooling to the room temperature, 21 parts of the following pigment was added, and put and sealed together with 200 g of zirconia beads having diameter of 0.5 mm into glass bottle. After milling for hours listed below by paint shaker, zirconia beads were eliminated.

Pigment Dispersion 3 (Black): Pigment Black 7 (#52 produced by Mitsubishi Chemical Corporation) 5 hours
Pigment Dispersion 4 (Cyan): Pigment Blue 15:4 (Chromo Fine Blue 6332JC produced by Dainichiseika Colour & Chemicals Mfg. Co., Ltd.) 5 hours
Pigment Dispersion 5 (Yellow): Pigment Yellow 150 (E4GN-GT CH20015 produced by LANXESS) 8 hours
Pigment Dispersion 6 (Magenta): Pigment Red 122 (Chromo Fine Red 6122JC produced by Dainichiseika Colour & Chemicals Mfg. Co., Ltd.)

(Preparation of Ink No. 19)
Following additives were added and mixed in order. After heating at 80° C. and mixing, obtained liquid was filtered via metal mesh filter of #3000 while heating, followed by cooling to prepare Ink No. 19.

| | |
|---|---|
| Polymerizable compound: A-400 (polyethyleneglycol #400 diacrylate produced by Shin-Nakamura Chemical Co., Ltd.) | 35.0 parts |
| Polymerizable compound: SR494 (4EO modified pentaerithrytol tetraacrylate produced by SARTOMER) | 17.0 parts |
| Polymerizable compound: SR499 (6EO modified trimethylol propane triacrylate produced by SARTOMER) | 17.9 parts |
| Polymerization inhibitor: Irgastab UV10 (produced by BASF Japan) | 0.1 parts |
| Photopolymerization initiator: TPO (phosphine oxide, DAROCURE TPO, produced by BASF Japan) | 6.0 parts |
| Polymerization initiator auxiliary agent: ITX (isopropyl thioxanthone, Speedcure ITX, produced by Lambson) | 2.0 parts |
| Polymerization initiator auxiliary agent: EDB (amine auxiliary agent, Speedcure EDB, produced by Lambson) | 3.0 parts |
| Pigment dispersion 3 | 19.0 parts |

(Preparation of Ink Nos. 20-30)

Ink Nos. 20-30 were prepared in the same manner as Ink preparation of Ink No. 19, except for changing the species and the content of each compound as described in Table 6 and changing heating temperature during ink preparation to 100° C. Then Ink sets for 4 colors as black, cyan, yellow and magenta were prepared as Ink set (A) by using Ink Nos. 19-22, Ink set (B) by Ink Nos. 23-26, and Ink set (C) by Ink Nos. 27-30.

(Measurement of Each Property of Inks)

Tsol, Tgel, ΔT, Tm, G' and G" of Ink Nos. 19-30 prepared above were measured according to the same method as described in Example 1. Results were shown in Table 6.

(Evaluation of Density Unevenness)

According to above method, onto Coated printing paper A (OK top Coat, basis weight of 128 g/m², produced by OJI PAPER), Coated printing paper B (New age, basis weight of 105 g/m², produced by OJI PAPER), PET laminated paper (Specialty 1621 produced by Gojo Paper MFG., Co., Ltd.), and polyethylene terephthalate film (White PET produced by MRUU SECCHAKU), image was printed and density unevenness was visually evaluated based on the following criteria.

A: No density unevenness was noticed in the image by observation from 15 cm distance.

TABLE 6

| | | Comp. | Comp. | Comp. | Comp. | Inv. | Inv. | Inv. | Inv. | Inv. | Inv. | Inv. | Inv. |
|---|---|---|---|---|---|---|---|---|---|---|---|---|---|
| | | | | | | | | Color | | | | | |
| | | Black | Cyan | Yellow | Magenta | Black | Cyan | Yellow | Magenta | Black | Cyan | Yellow | Magenta |
| | | | | | | | | Ink No. | | | | | |
| | | 19 | 20 | 21 | 22 | 23 | 24 | 25 | 26 | 27 | 28 | 29 | 30 |
| Ink set | | (A) | (A) | (A) | (A) | (B) | (B) | (B) | (B) | (C) | (C) | (C) | (C) |
| Ink composition | A-400 | 35.0 | 35.0 | 35.0 | 35.0 | 29.0 | 29.0 | 29.0 | 29.0 | 30.0 | 30.0 | 30.0 | 30.0 |
| | SR494 | 17.0 | 17.0 | 17.0 | 17.0 | 17.0 | 17.0 | 17.0 | 17.0 | 17.0 | 17.0 | 17.0 | 17.0 |
| | SR499 | 17.9 | 17.9 | 17.9 | 17.9 | 17.9 | 17.9 | 17.9 | 17.9 | 17.9 | 17.9 | 17.9 | 17.9 |
| | Irgastab UV10 | 0.1 | 0.1 | 0.1 | 0.1 | 0.1 | 0.1 | 0.1 | 0.1 | 0.1 | 0.1 | 0.1 | 0.1 |
| | ITX | 2.0 | 2.0 | 2.0 | 2.0 | 2.0 | 2.0 | 2.0 | 2.0 | 2.0 | 2.0 | 2.0 | 2.0 |
| | TPO | 6.0 | 6.0 | 6.0 | 6.0 | 6.0 | 6.0 | 6.0 | 6.0 | 6.0 | 6.0 | 6.0 | 6.0 |
| | EDB | 3.0 | 3.0 | 3.0 | 3.0 | 3.0 | 3.0 | 3.0 | 3.0 | 3.0 | 3.0 | 3.0 | 3.0 |
| | Pigment dispersion 3 | 19.0 | | | | 19.0 | | | | 19.0 | | | |
| | Pigment dispersion 4 | | 19.0 | | | | 19.0 | | | | 19.0 | | |
| | Pigment dispersion 5 | | | 19.0 | | | | 19.0 | | | | 19.0 | |
| | Pigment dispersion 6 | | | | 19.0 | | | | 19.0 | | | | 19.0 |
| Gelling agent | Glyceryl behenate | | | | | 6.0 | 6.0 | 6.0 | 6.0 | | | | |
| | Behenic acid | | | | | | | | | 5.0 | 5.0 | 5.0 | 5.0 |
| Physical properties of Ink | Tsol | — | — | — | — | 61 | 62 | 60 | 62 | 63 | 62 | 62 | 61 |
| | Tgel | — | — | — | — | 52 | 52 | 51 | 52 | 54 | 54 | 53 | 53 |
| | ΔT | — | — | — | — | 9 | 10 | 9 | 10 | 9 | 8 | 9 | 7 |
| | Tm | — | — | — | — | 43 | 42 | 42 | 42 | 45 | 46 | 45 | 46 |
| | G' | — | — | — | — | 121 | 130 | 220 | 195 | 150 | 200 | 271 | 246 |
| | G" | — | — | — | — | 400 | 550 | 600 | 521 | 420 | 651 | 890 | 769 |

(Formation of Color Image)

Color image was evaluated by using a line head printer of a line head system loaded with piezo type recording head as shown in FIG. 4. Each color Ink in Ink set (A) to (C) was employed into the each inkjet recording head for Y, M, C and K. Onto Coated printing paper A (OK top Coat, basis weight of 128 g/m², produced by OJI PAPER), Coated printing paper B (New age, basis weight of 105 g/m², produced by OJI PAPER), PET laminated paper (Specialty 1621 produced by Gojo Paper MFG., Co., Ltd.), and polyethylene terephthalate film (White PET produced by MRUU SECCHAKU), Image of JIS/SCID N5 "bicycle" pattern were printed in A4 size in the same manner as Example 3. The temperature of the recording medium and the recording head each were arranged to be the temperature described in Table 5 and Image Nos. 75-87 were formed.

(Evaluation of Formed Image)

Above formed images 75-87 were evaluated with respect to density unevenness, sense of homogeneous glossiness and abrasion resistance according to the method below.

B: Density unevenness was noticed in a part of the image by observation from 15 cm distance, but no density unevenness was noticed by observation from 30 cm distance.

C: Density unevenness was noticed in the image by observation from 30 cm distance.

(Evaluation of Sense of Homogeneous Glossiness)

According to above method, onto Coated printing paper A (OK top Coat, basis weight of 128 g/m², produced by OJI PAPER), Coated printing paper B (New age, basis weight of 105 g/m², produced by OJI PAPER), PET laminated paper (Specialty 1621 produced by Gojo Paper MFG., Co., Ltd.), and polyethylene terephthalate film (White PET produced by MRUU SECCHAKU), images were printed and sense of homogeneous glossiness was visually evaluated based on the following criteria.

A: Sense glossiness was homogeneous as comparable to an off-set printed matter.

B: Glossiness was non-homogeneous in the high density region of the secondary color or in boundary region of the image.

C: Glossiness was non-homogeneous in entire image and practically problematic.

(Evaluation of Abrasion Resistance)

According to above method, onto Coated printing paper A, image was printed. Based on a method described in "JIS standard K5701-1 6.2.3 Abrasion Test", Coated printing paper A of suitable size was put on the formed image and frictional with load. Then, decrease of the image density was visually evaluated and abrasion resistance was evaluated based on the following criteria.

A: No change was noticed in the image after friction of 50 times or more.

B: Decrease of image density was observed after friction of 50 times, but practically non-problematic.

C: Obvious decrease of image density was observed after friction of less than 50 times, and practically problematic.

Obtained evaluation results were shown in Table 7.

Herein, Tsol, Tgel, ΔT and Tm of magenta inks in each Ink set were listed in Table 7.

TABLE 7

| Image No. | Ink set No. | Magenta ink | | | | *1 (° C.) | *2 (° C.) | *3 (° C.) | Density unevenness | | | | Sense of homogeneous glossiness | | | | Abrasion resistance | Remarks |
|---|---|---|---|---|---|---|---|---|---|---|---|---|---|---|---|---|---|---|
| | | Tsol (° C.) | Tgel (° C.) | ΔT (° C.) | Tm (° C.) | | | | *4 | *5 | *6 | *7 | *4 | *5 | *6 | *7 | *4 | |
| 75 | (A) | — | — | — | — | 25 | — | 80 | C | C | C | C | C | C | C | C | A | Comp. |
| 76 | (B) | 62 | 52 | 10 | 42 | 34 | −8 | 80 | A | A | A | A | C | C | C | C | A | Comp. |
| 77 | (B) | 62 | 52 | 10 | 42 | 42 | 0 | 80 | A | A | A | A | A | A | A | A | A | Inv. |
| 78 | (B) | 62 | 52 | 10 | 42 | 48 | +6 | 80 | C | C | C | C | B | B | C | C | A | Comp. |
| 79 | (C) | 61 | 53 | 7 | 46 | 39 | −7 | 80 | A | A | A | A | C | C | C | C | A | Comp. |
| 80 | (C) | 61 | 53 | 7 | 46 | 45 | −1 | 80 | A | A | A | A | A | A | A | A | A | Inv. |
| 81 | (C) | 61 | 53 | 7 | 46 | 50 | +4 | 80 | B | A | B | B | A | A | A | A | A | Inv. |
| 82 | (C) | 61 | 53 | 7 | 46 | 52 | +6 | 80 | C | C | C | C | B | B | C | C | A | Comp. |

*1: Temperature of Recording medium,
*2: Temperature of Recording medium − Tm,
*3: Temperature of Ejection
*4: Coated paper A,
*5: Coated paper B,
*6: Laminated paper,
*7: White PET As can clearly seen from the results of Table 7, by using the actinic energy radiation curable inkjet inks of the present invention and by using the inkjet recording method, the formed image exhibits no image defect such as density unevenness on the various recording medium such as coated paper or film, sense of homogeneous glossiness, and excellent abrasion resistance comparing to Comparative Examples.

What is claimed is:

1. An actinic energy radiation curable inkjet ink for an inkjet recording, wherein the actinic energy radiation curable inkjet ink undergoes reversible sol/gel phase transition depending on temperature, the actinic energy radiation curable inkjet ink contains a gelling agent selected from the group of petroleum based waxes, vegetable based waxes, animal based waxes, mineral based waxes, modified waxes, higher fatty acids, higher alcohols, fatty acid amides, N-substituted fatty acid amides, special fatty acid amides, higher amines, fatty acid ester compounds, synthetic waxes, polymerized waxes, dimer acids and dimer diols in the range from not less than 1% by mass to less than 10% by mass, and the actinic energy radiation curable inkjet ink has a storage elastic modulus G' at temperature Tm (° C.) in the range from not less than 0.1 Pa to less than 1,000 Pa and the storage elastic modulus G' smaller than a loss elastic modulus G" thereof, provided that Tm (° C.) is a temperature defined by Tm=Tgel−ΔT, wherein ΔT is further represented by a temperature difference between a solation temperature Tsol (° C.) and a gelation temperature Tgel (° C.) of the actinic energy radiation curable inkjet ink as ΔT=Tsol−Tgel, and the solation temperature Tsol is defined by a temperature where the storage elastic modulus G' reaches 0.1 Pa when a temperature change of a dynamic viscoelasticity is measured under a temperature raising rate of 0.1° C./s, a strain of 5% and an angle frequency of 10 radian/s, and the gelation temperature Tgel is further defined by a temperature where the storage elastic modulus G' reaches 0.1 Pa when a temperature change of a dynamic viscoelasticity is measured under a temperature lowering rate of 0.1° C./s, a strain of 5% and an angle frequency of 10 radian/s.

2. The actinic energy radiation curable inkjet ink of claim 1, wherein a content of the gelling agent is in the range from not less than 2% by mass to less than 7% by mass.

3. The actinic energy radiation curable inkjet ink of claim 1, wherein ΔT is in the range from not less than 3° C. to less than 20° C.

4. The actinic energy radiation curable inkjet ink of claim 1, wherein the solation temperature Tsol is in the range from not less than 40° C. to less than 90° C.

5. The actinic energy radiation curable inkjet ink of claim 1, wherein a viscosity of the actinic energy radiation curable inkjet ink in an inkjet recording head is in the range from not less than 3 mPa·s to less than 20 mPa·s.

6. An actinic energy radiation curable inkjet recording method comprising a step of recording an actinic energy radiation curable inkjet ink via an inkjet recording head onto a recording medium arranging a temperature in the range of Tm ±5° C., wherein the actinic energy radiation curable inkjet ink undergoes reversible sol/gel phase transition depending on temperature;

the actinic energy radiation curable inkjet ink contains a gelling agent selected from the group of petroleum based waxes, vegetable based waxes, animal based waxes, mineral based waxes, modified waxes, higher fatty acids, higher alcohols, fatty acid amides, N-substituted fatty acid amides, special fatty acid amides, higher amines, fatty acid ester compounds, synthetic waxes, polymerized waxes, dimer acids and dimer diols in the range from not less than 1% by mass to less than 10% by mass; and the actinic energy radiation curable inkjet ink has a storage elastic modulus G' at temperature Tm (° C.) in the range from not less than 0.1 Pa to less than 1,000 Pa and the storage elastic modulus G' smaller than a loss elastic modulus G" thereof, provided that Tm (° C.) is a temperature defined by Tm=Tgel−ΔT, wherein ΔT is further represented by a temperature difference between a solation temperature Tsol (° C.) and a gelation temperature Tgel (° C.) of the actinic energy radiation curable inkjet ink as ΔT=Tsol−Tgel, and the solation temperature Tsol is defined by a temperature where the storage elastic modulus G' reaches 0.1 Pa when a temperature change of a dynamic viscoelasticity is measured under a temperature raising rate of 0.1° C./s, a strain of 5% and an angle frequency of 10 radian/s, and the gelation temperature Tgel is further defined by a temperature where the storage elastic modulus G' reaches 0.1 Pa when a temperature change of a dynamic viscoelasticity is measured under a temperature lowering rate of 0.1° C./s, a strain of 5% and an angle frequency of 10 radian/s.

7. The actinic energy radiation curable inkjet recording method of claim 6, wherein a temperature of the recording medium is arranged in the range of Tm ±3° C.

8. The actinic energy radiation curable inkjet recording method of claim 6, wherein a difference of temperatures between the gelation temperature and the temperature of the recording medium is controlled in the range from 5 to 15° C.

9. The actinic energy radiation curable inkjet recording method of claim 6, wherein a content of the gelling agent is in the range from not less than 2% by mass to less than 7% by mass.

10. The actinic energy radiation curable inkjet recording method of claim 6, wherein ΔT is in the range from not less than 3° C. to less than 20° C.

11. The actinic energy radiation curable inkjet recording method of claim 6, wherein the solation temperature Tsol is in the range from not less than 40° C. to less than 90° C.

12. The actinic energy radiation curable inkjet recording method of claim 6 comprising a step of heating the actinic energy radiation curable inkjet ink in the inkjet head in the range of from not less than Tsol+10° C. to less than Tsol+40° C.

13. The actinic energy radiation curable inkjet recording method of claim 6, wherein a viscosity of the actinic energy radiation curable inkjet ink in the inkjet head is in the range from not less than 3 mPa·s to less than 20 mPa·s.

14. The actinic energy radiation curable inkjet recording method of claim 6 comprising a step of curing the actinic energy radiation curable inkjet ink by irradiating an actinic energy radiation after forming an image.

\* \* \* \* \*